(12) United States Patent
Tsai et al.

(10) Patent No.: US 10,845,452 B2
(45) Date of Patent: *Nov. 24, 2020

(54) HYBRID POSITIONING METHOD, ELECTRONIC APPARATUS AND COMPUTER-READABLE RECORDING MEDIUM THEREOF

(71) Applicant: CM HK Limited, Fortress Hill (HK)

(72) Inventors: Yu-Kuen Tsai, Taipei (TW); Ching-Lin Hsieh, Taipei (TW); Chien-Chih Hsu, Taipei (TW)

(73) Assignee: CM HK LIMITED, Fortress Hill (HK)

( * ) Notice: Subject to any disclaimer, the term of this patent is extended or adjusted under 35 U.S.C. 154(b) by 588 days.

This patent is subject to a terminal disclaimer.

(21) Appl. No.: 15/430,607

(22) Filed: Feb. 13, 2017

(65) Prior Publication Data

US 2017/0153313 A1 Jun. 1, 2017

Related U.S. Application Data

(63) Continuation-in-part of application No. 15/357,176, filed on Nov. 21, 2016, now Pat. No. 9,885,734, (Continued)

(30) Foreign Application Priority Data

May 8, 2013 (CN) ...................... 2013 2 0245496 U

(51) Int. Cl.
*G01S 5/02* (2010.01)
*G01S 19/13* (2010.01)
(Continued)

(52) U.S. Cl.
CPC .............. *G01S 5/021* (2013.01); *G01C 21/14* (2013.01); *G01C 22/006* (2013.01); *G01D 3/10* (2013.01);
(Continued)

(58) Field of Classification Search
CPC ....................................................... G01S 5/021
See application file for complete search history.

(56) References Cited

U.S. PATENT DOCUMENTS

| | | | | |
|---|---|---|---|---|
| 4,899,285 A | * | 2/1990 | Nakayama | ............. G01C 21/28 342/357.31 |
| 4,965,550 A | | 10/1990 | Wroblewski | |

(Continued)

FOREIGN PATENT DOCUMENTS

| | | |
|---|---|---|
| CN | 102540201 A | 7/2012 |
| CN | 102062862 B | 11/2012 |

(Continued)

OTHER PUBLICATIONS

Soloviev et al., Utilizing Multipath Reflections in Deeply Integrated GPS/INS Architecture for Navigation in Urban Environments, 2008 IEEE, pp. 383-393.

(Continued)

*Primary Examiner* — Hyun D Park
(74) *Attorney, Agent, or Firm* — McClure, Qualey & Rodack, LLP

(57) ABSTRACT

Hybrid positioning methods and electronic apparatuses are provided. A representative method includes: obtaining initial location information; computing initial moving information based upon the sensor readings; computing estimated location information based on the initial moving information and the initial location information; acquiring geographical location readings if a location update condition is satisfied; generating reference location information based on the geographical location readings acquired; comparing the estimated location information with the reference location information to obtain a deviation information; computing a calibrated moving information based on the estimated location information and the deviation information; and computing a calibrated location information based on the devia- (Continued)

tion information, calibrated moving information and the estimated location information.

11 Claims, 14 Drawing Sheets

Related U.S. Application Data which is a continuation-in-part of application No. 14/088,452, filed on Nov. 25, 2013, now Pat. No. 9,534,927, which is a continuation-in-part of application No. 13/945,930, filed on Jul. 19, 2013, now Pat. No. 9,798,390, and a continuation-in-part of application No. 14/033,553, filed on Sep. 23, 2013, now Pat. No. 9,104,417.

(60) Provisional application No. 62/340,523, filed on May 24, 2016.

(51) Int. Cl.
  *G01S 19/46* (2010.01)
  *G01C 21/14* (2006.01)
  *G01C 22/00* (2006.01)
  *G01D 3/10* (2006.01)
  *H04W 4/029* (2018.01)

(52) U.S. Cl.
  CPC .............. *G01S 19/13* (2013.01); *G01S 19/46* (2013.01); *H04W 4/029* (2018.02)

(56) References Cited

U.S. PATENT DOCUMENTS

| | | | |
|---|---|---|---|
| 5,355,503 A | 10/1994 | Soffel et al. | |
| 5,928,309 A * | 7/1999 | Korver | G01C 21/165 342/359 |
| 6,256,746 B1 | 7/2001 | Cheng | |
| 6,557,107 B1 | 4/2003 | Kim | |
| 6,683,564 B1 | 1/2004 | McBurney | |
| 6,944,542 B1 * | 9/2005 | Eschenbach | G01C 21/165 701/472 |
| 7,000,469 B2 | 2/2006 | Foxlin et al. | |
| 8,570,218 B2 | 10/2013 | Aibara | |
| 8,618,978 B2 | 12/2013 | Torimoto et al. | |
| 9,104,417 B2 | 8/2015 | Ye et al. | |
| 9,591,458 B2 | 3/2017 | Liu et al. | |
| 9,720,098 B2 | 8/2017 | Toda | |
| 2007/0113286 A1 | 5/2007 | Cromer et al. | |
| 2008/0238772 A1 | 10/2008 | Soloviev et al. | |
| 2009/0184849 A1 | 7/2009 | Nasiri et al. | |
| 2009/0265671 A1 | 10/2009 | Sachs et al. | |
| 2011/0109330 A1 | 5/2011 | Ikuta et al. | |
| 2011/0163955 A1 | 7/2011 | Nasiri et al. | |
| 2012/0022844 A1 | 1/2012 | Teixeira | |
| 2012/0277545 A1 | 11/2012 | Texeira | |
| 2014/0136871 A1 | 5/2014 | Jung et al. | |
| 2015/0365790 A1 | 12/2015 | Edge et al. | |

FOREIGN PATENT DOCUMENTS

| | | |
|---|---|---|
| CN | 104914457 A | 9/2015 |
| CN | 104931983 B | 4/2018 |
| EP | 1145036 B1 | 8/2008 |
| TW | 200941026 A | 10/2009 |
| TW | 201615041 A | 4/2016 |

OTHER PUBLICATIONS

Jia, Ning. "Fall Detection Application by Using 3-Axis Accelerometer ADXL345". Analog Devices. AN-1 023 Application Note. Copyright 2009. Availabile: http:/ /blog.ednch ina.geo.eet-en.com/ uploadedn/Biog/2009/7/1/32909b38-5e12-4a32-bd7 e-19e75256ed35. pdf.
Notice of Allowance and Search Report dated Dec. 29, 2017 in TW Application (No. 106115961).
Chinese language office action dated Nov. 29, 2019, issued in application No. CN 201710362632.6.
Chinese language office action dated Apr. 23, 2020, issued in application No. CN 201710362632.6.
English language translation of office action.

\* cited by examiner

HYBRID POSITIONING METHOD, ELECTRONIC APPARATUS AND COMPUTER-READABLE RECORDING MEDIUM THEREOF

CROSS REFERENCE TO RELATED APPLICATIONS

This utility application is based on and claims priority to U.S. provisional application 62/340,523, filed on May 24, 2016, and is a continuation-in-part application, which is based on and claims priority to U.S. application Ser. No. 15/357,176, filed on Nov. 21, 2016. U.S. application Ser. No. 15/357,176 is a continuation-in-part application of and claims the priority benefit of U.S. application Ser. No. 14/088,452, filed on Nov. 25, 2013, which is a continuation-in-part application of and claims the priority benefit of U.S. application Ser. No. 13/945,930, filed on Jul. 19, 2013, and which is also a continuation-in-part application of and claims the priority benefit of U.S. application Ser. No. 14/033,553, filed on Sep. 23, 2013 now patented as U.S. Pat. No. 9,104,417, issued on Aug. 11, 2015. U.S. application Ser. No. 14/033,553 claims the priority benefit of China application 201320245496.X, filed on May 8, 2013. The entirety of each of the above-mentioned patent applications is hereby incorporated by reference herein and made a part of this specification.

TECHNICAL FIELD

This application involves the use of absolute positioning and relative positioning techniques, such as for use in mobile devices.

DESCRIPTION OF THE RELATED ART

Absolute positioning techniques, such as global positioning system (GPS), Wi-Fi, and proximity tagging, provide reliable and accurate location information, and yet updating such information at a maximum possible rate may draw significant power and may not guarantee full coverage. Relative positioning techniques, such as pedestrian dead reckoning (PDR), estimate a current position of a user device based upon a previously determined position by using its inertial sensors and work even in an environment where absolute location information is not available, and yet the estimated current position is subject to cumulative errors.

Notably, a mobile device is often equipped with embedded sensors (such as an accelerometer, a gyro-sensor and a magnetometer) that may be used for performing relative positioning techniques. A central processing unit (CPU) of the mobile device can collect samples generated by the sensors and perform some processing based on the samples. For example, the CPU can calculate the movement and the orientation of the mobile device or calculate how many steps the user of the mobile device has walked.

Since the sensors keep generating samples, the CPU has to receive and analyze the samples constantly. Therefore, the CPU has to be in its full operation mode for extended periods of time, which consumes electric power and shortens the battery life of the mobile device.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
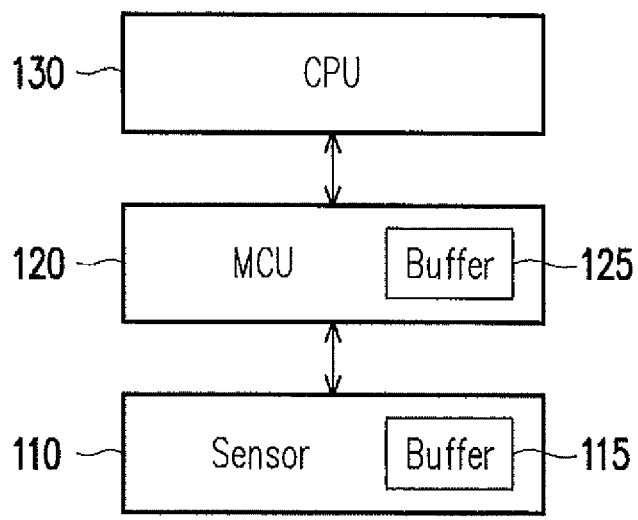
FIG. 1 is a schematic diagram showing a mobile device according to an embodiment of the present application.

Some embodiments will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a schematic diagram showing a mobile device 100 according to an embodiment of the present application. The mobile device 100 may be a remote controller, a smart phone, a personal digital assistant (PDA), a tablet computer, or a notebook computer, etc. The mobile device 100 includes a sensor 110, an MCU 120, and a CPU 130. The MCU 120 is coupled to the sensor 110. The CPU 130 is coupled to the MCU 120. The sensor 110 includes a buffer 115. The MCU 120 includes a buffer 125. The buffers 115 and 125 are storage devices, such as register or memory.

The sensor 110 generates a plurality of samples. The sensor 110 may store the samples in the buffer 115. The MCU 120 fetches the samples from the sensor 110 and performs an initial preset processing according to the samples to generate one or more results of the initial preset processing. The MCU 120 may store either the samples or the result(s) in the buffer 125. Alternatively, the MCU 120 may store both the samples and the result(s) in the buffer 125.

The CPU 130 fetches the one or more results from the MCU 120 or receives a signal based on the one or more results from the MCU 120. The CPU 130 performs further preset processing according to the one or more results or the signal from the MCU 120.

In an embodiment of the present application, the sensor 110 generates the samples at a frequency $F_1$, which means the sensor 110 generates $F_1$ samples every second. The MCU 120 fetches the samples from the sensor 110 in batches at a frequency $F_2$. The CPU 130 fetches the results from the MCU 120 in batches at a frequency $F_3$. The frequency $F_1$ may be higher than or equal to the frequency $F_2$. The frequency $F_2$ may be higher than or equal to the frequency $F_3$.

For example, $F_1$ may be 2000 Hz, $F_2$ may be 1 Hz, and $F_3$ may be 0.001 Hz. The sensor 110 generates 2000 samples every second. The MCU 120 fetches the samples from the sensor 110 once in every second. In each fetching, the MCU 120 fetches the 2000 samples as a single batch from the sensor 110. After each fetching, the MCU 120 performs the initial preset processing and generates 40 results based on the 2000 samples. The CPU 130 fetches the 40 results as a single batch from the MCU 120 once every 1000 seconds. After each fetching, the CPU 130 performs further preset processing according to the 40 results. This batch fetching mechanism alleviates the burden of obtaining samples of the MCU 120 because the MCU 120 does not have to fetch the samples one by one from the sensor 110. Similarly, this batch fetching mechanism alleviates the burden of obtaining results of the CPU 130 because the CPU 130 does not have to fetch the results one by one from the MCU 120.

The CPU 130 executes the operating system (OS) and the applications of the mobile device 100. The further preset processing is just one of many tasks performed by the CPU 130. The MCU 120 is exclusively dedicated to performing the initial preset processing according to the samples and providing the one or more results or the signal to the CPU 130. The CPU 130 has much more processing power than the MCU 120 does and the CPU 130 consumes much more electric power than the MCU 120 does. The MCU 120 takes over the burden of collecting the samples from the sensor 110 and performing the initial preset processing from the CPU 130 so that the CPU 130 can sleep as long as possible in order to save power and extend the battery life of the mobile device 100. The batch fetching of results from the MCU 120 helps to reduce the waking frequency of the CPU 130, which saves more power. The MCU 120 constantly polls the sensor 110 and fetches the samples from the sensor 110. The MCU 120 never sleeps.

The CPU 130 may sleep until the CPU 130 wakes up to fetch the result from the MCU 120 or until the CPU 130 is woke up by the signal from the MCU 120. The MCU 120 may wake up the CPU 130 and notifies the CPU 130 to fetch the result from the MCU 120. Alternatively, the CPU 130 may wake up when the user of the mobile device 100 launches an application or when a timer expires. In other words, the CPU 130 may wake up without notification from the MCU 120, and then the CPU 130 may fetch the one or more results from the MCU 120.

Figure 2:
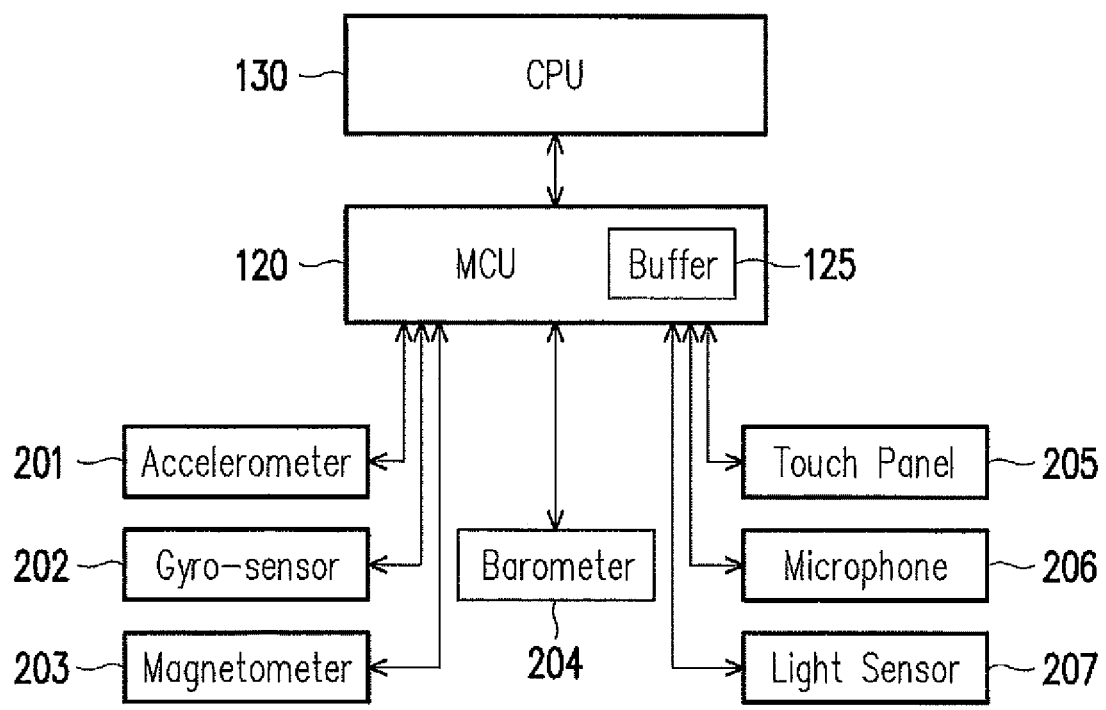
FIG. 2 is a schematic diagram showing a mobile device according to another embodiment of the present application.

FIG. 2 is a schematic diagram showing a mobile device 200 according to another embodiment of the present application. The mobile device 200 includes the CPU 130, the MCU 120, and seven sensors 201-207, namely, the accelerometer 201, the gyro-sensor 202, the magnetometer 203, the barometer 204, the touch panel 205, the microphone 206, and the light sensor 207. The accelerometer 201 generates samples of accelerations associated with movements and rotations of the mobile device 200. The gyro-sensor 202 generates samples of angular velocities associated with movements and rotations of the mobile device 200. The magnetometer 203 generates samples of magnetism associated with movements and rotations of the mobile device 200. The barometer 204 generates samples of atmospheric pressures associated with movements and rotations of the mobile device 200. The touch panel 205 generates samples of locations touched by the user of the mobile device 200. The microphone 206 generates samples of sound around the mobile device 200. The light sensor 207 generates samples of the ambient brightness around the mobile device 200. Each of the sensors 201-207 may include a buffer as the sensor 110 does.

The MCU 120 is coupled to all of the sensors 201-207 and operates as a sensor hub. Each subset of the mobile device 200 including the CPU 130, the MCU 120, and one of the sensors 201-207 may operate in the same ways as the mobile device 100 shown in FIG. 1 does. In addition, the MCU 120 and the CPU 130 may perform preset processing based on samples generated by multiple sensors altogether. In another embodiment of the present application, the mobile device 200 may include less than seven sensors or more than seven sensors.

In an embodiment of the present application, the mobile device 200 may provide the function of a pedometer. The MCU 120 fetches the samples from the accelerometer 201 and performs the initial preset processing by calculating how many steps the user of the mobile device 200 has walked according to the samples. The MCU 120 may store the result of the initial preset processing, namely, the number of steps, in the buffer 125.

The MCU 120 may wake up the CPU 130 to fetch the result every N steps, wherein N is a preset positive integer. Alternatively, the CPU may wake up periodically to fetch the result from the MCU 120. Alternatively, the CPU may wake up whenever the user launches an application to see the number of steps. The infrequent awakening of the CPU 130 saves energy. Sometimes the user walks for hours and does not want to see the number of steps until the user arrives at home. In this case, the CPU 130 may sleep for hours and saves a lot of energy.

In addition to counting the number of steps, the initial preset processing performed by the MCU 120 may include calculating the direction and the distance of each step of the user according to the samples generated by the accelerometer 201, the gyro-sensor 202, and the magnetometer 203. The MCU 120 may store the results, namely, the directions and distances of the steps, in the buffer 125. The MCU 120 may wake up the CPU 130 and notifies the CPU 130 to fetch the results when the size of the results reaches a preset percentage of the capacity of the buffer 125.

When the CPU 130 wakes up, the further preset processing performed by the CPU 130 may include displaying the number of steps, displaying a chart showing the number of steps in each hour, or plotting the trace of the user according to the directions and the distances of the steps, etc.

In another embodiment of the present application, the mobile device 200 may provide functions of positioning and navigation based on the Global Positioning System (GPS). The user may turn off the GPS function to save power. The CPU 130 sleeps when the GPS function is turned off. During the period when the GPS function is turned off, the MCU 120 may fetch the samples generated by the accelerometer 201, the gyro-sensor 202, and the magnetometer 203 to calculate the moving trace of the mobile device 200. The MCU 120 may store the moving trace in the buffer 125 as the result of the initial preset processing. When the user turns on the GPS function, the CPU 130 may fetch the moving trace from the MCU 120 and use the moving trace and the last GPS position of the mobile device 200 to calculate a reference position so that the CPU 130 can find the current GPS position of the mobile device 200 faster. In other embodiments, other manners of controlling the use of absolute positioning information (such as provided by a GPS) will be described in detail later.

In another embodiment of the present application, the MCU 120 may calculate the moving trace of the mobile device 200 according to the samples generated by the barometer 204 in addition to the samples generated by the accelerometer 201, the gyro-sensor 202, and the magnetometer 203, so that the moving trace can include more accurate estimation of the change of altitude of the mobile device 200.

In another embodiment of the present application, the mobile device 200 may switch between an unlocked state and a locked state. The mobile device 200 receives input from the touch panel 205 normally in the unlocked state, while the mobile device 200 does not receive input from the touch panel 205 in the locked state. The CPU 130 sleeps in the locked state. For example, the mobile device 200 may enter the locked state from the unlocked state when the mobile device 200 has been idle for a preset period of time, and the mobile device 200 may return to the unlocked state when the user performs a preset operation on the mobile device 200.

The preset operation for unlocking the mobile device 200 may be drawing a preset trace on the touch panel 205. In this case, the MCU 200 may fetch the samples generated by the touch panel 205 and analyze the samples to determine whether the user draws the preset trace or not. When the user finishes the preset trace on the touch panel 205, the MCU 120 may send a signal, such as an interrupt, to wake up the CPU 130. The CPU 130 switches the mobile device 200 from the locked state to the unlocked state in response to the signal.

Alternatively, the preset operation for unlocking the mobile device 200 may be speaking a preset password to the microphone 206. In this case, the MCU 200 may fetch the samples generated by the microphone 206 and perform speech recognition on the samples to determine whether the user speaks the preset password or not. When the user speaks the preset password to the microphone 206, the MCU 120 may send a signal to wake up the CPU 130. The CPU 130 switches the mobile device 200 from the locked state to the unlocked state in response to the signal.

Alternatively, the preset operation for unlocking the mobile device 200 may be holding the mobile device 200 and moving the mobile device 200 along a preset trace. In this case, the MCU 200 may fetch the samples generated by the accelerometer 201, the gyro-sensor 202, and the magnetometer 203 and analyze the samples to determine whether the mobile device 200 has moved along the preset trace or not. When the mobile device 200 has moved along the preset trace, the MCU 120 may send a signal to wake up the CPU 130. The CPU 130 switches the mobile device 200 from the locked state to the unlocked state in response to the signal.

In another embodiment of the present application, the mobile device 200 may include a display. The MCU 120 may fetch the samples generated by the light sensor 207 and analyze the samples to calculate the average ambient brightness of the mobile device 200 over a recent period of time with a predetermined length. The MCU 120 may store the average ambient brightness in the buffer 125. The CPU 130 may fetch the average ambient brightness periodically and adjusts the display brightness of the display according to the average ambient brightness.

Figure 3:
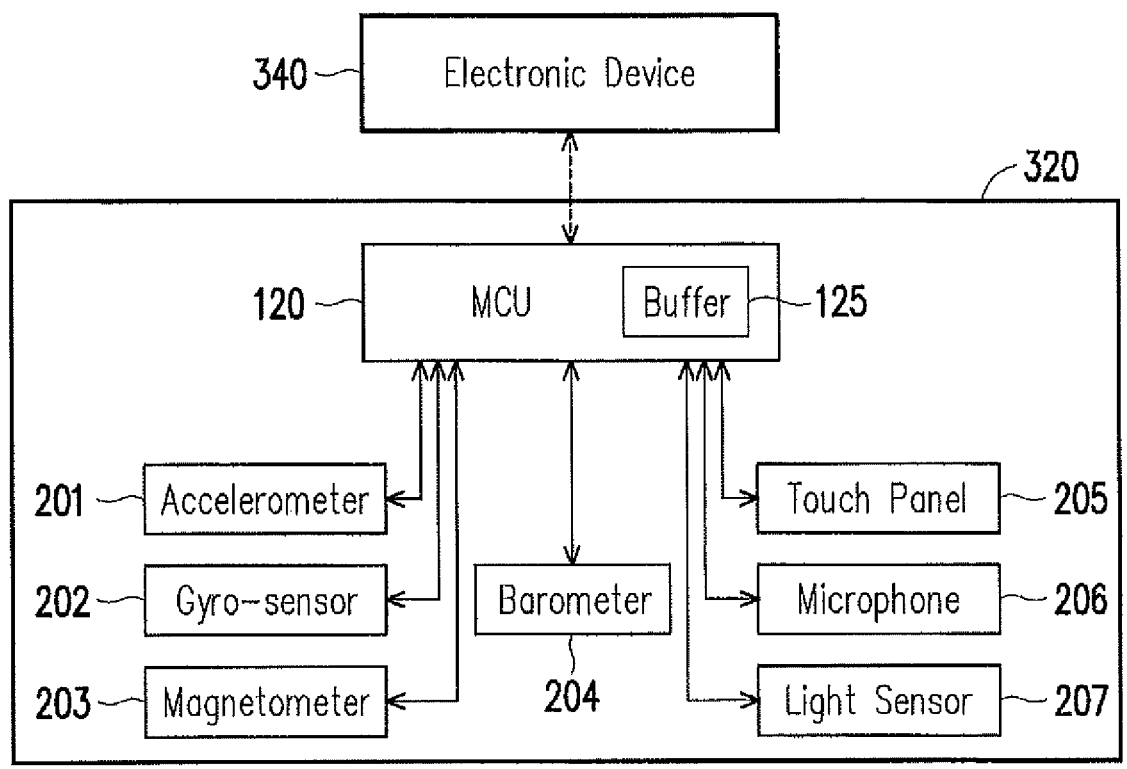
FIG. 3 is a schematic diagram showing a mobile device according to another embodiment of the present application.

FIG. 3 is a schematic diagram showing a mobile device 320 according to another embodiment of the present application. The mobile device 320 includes the MCU 120 and the sensors 201-207. Similar to the previous embodiments, the MCU 120 may fetch the samples generated by one or more of the sensors 201-207 and performs the initial preset processing according to the samples. The MCU 120 may store the samples and/or the result(s) of the initial preset processing in the buffer 125. The MCU 120 in this embodiment is configured to connect to the electronic device 340 through a wireless connection or a wired connection. The MCU 120 is further configured to provide the result(s) of the initial preset processing to the electronic device 340 through the wireless connection or the wired connection. The electronic device 340 may perform further preset processing according to the one or more results. In some aspects, the electronic device 340 is analogous to the CPU 130 in the previous embodiments.

For example, the mobile device 320 may be a wearable electronic pedometer. The MCU 120 counts the number of steps walked by the user according to the samples generated by the accelerometer 201. The MCU 120 may store the number of steps in the buffer 125. In addition, the MCU 120 may provide the number of steps to the electronic device 340 for further viewing or processing.

For another example, the mobile device 320 may be a small device attachable to a palm or an arm of a user or a golf stick wielded by the user. When the user plays golf, the MCU 120 may fetch the samples generated by the accelerometer 201, the gyro-sensor 202, and the magnetometer 203 to calculate the number of swings of the golf stick made by the user. The MCU 120 may store the number of swings in the buffer 125. In addition, the MCU 120 may provide the number of swings to the electronic device 340 for further viewing or processing.

Alternatively, the MCU may analyze the samples generated by the accelerometer 201, the gyro-sensor 202, and the magnetometer 203 to obtain the time and force of each swing of the golf stick made by the user. The MCU 120 may store the results of the analysis in the buffer 125. In addition, the MCU 120 may provide the results of the analysis to the electronic device 340 for further viewing or processing.

In some embodiments, the MCU provided by the present application is a sensor hub with a buffer. The MCU can take over the burden of collecting and analyzing the samples generated by the sensors from the CPU of a mobile device. As a result, the MCU alleviates the burden of the CPU and the CPU may sleep as long as possible to save energy and extend the battery life of the mobile device.

Figure 4:
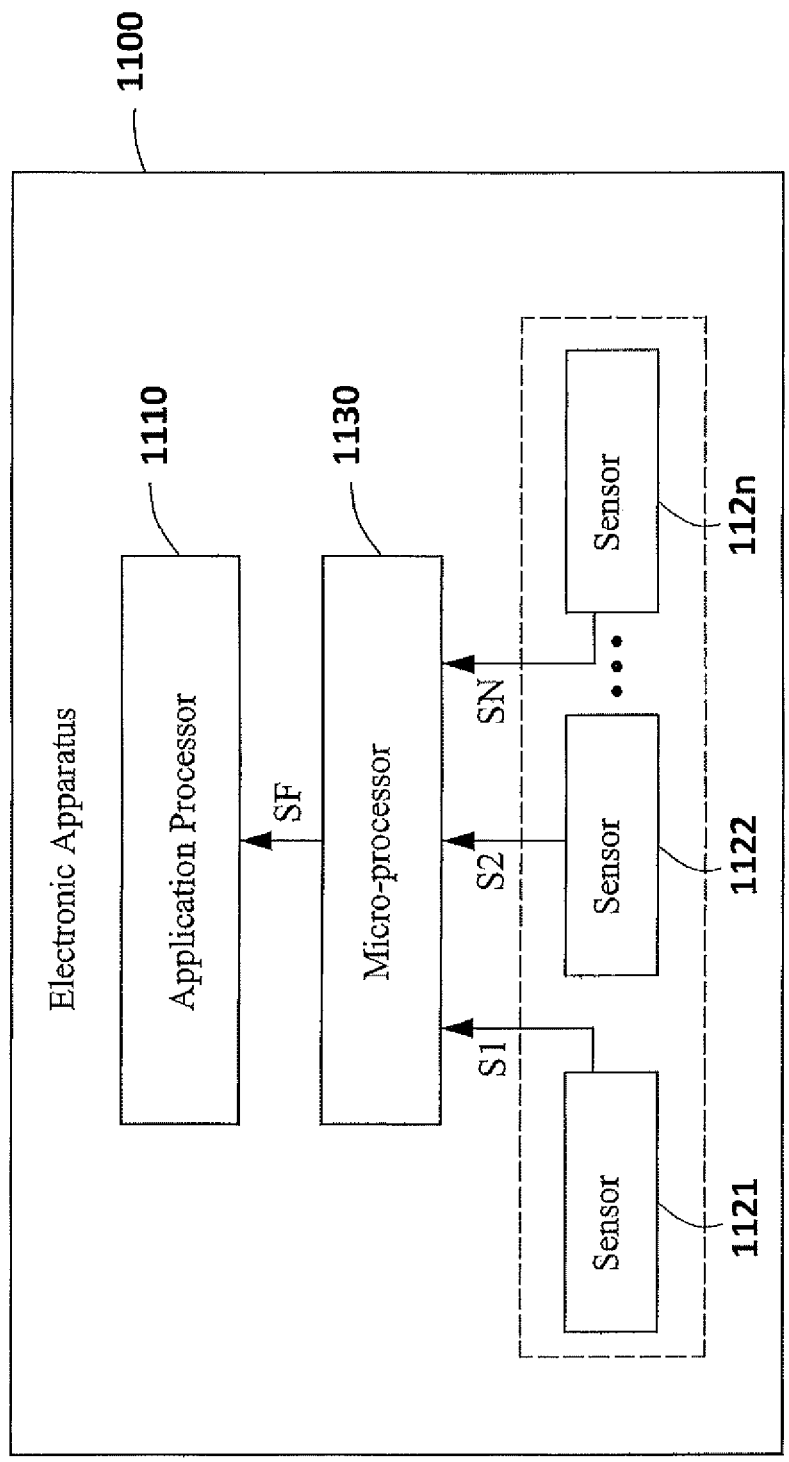
FIG. 4 is a diagram showing an electronic apparatus according to another embodiment of the present application.

Please refer to FIG. 4, which is a diagram showing an electronic apparatus 1100 according to another embodiment of the present application. The electronic apparatus 1100 can be a mobile phone, a tablet PC, a PDA, etc. The electronic apparatus 1100 may include, but is not limited to, an application processor (AP or CPU) 1110, a plurality of sensors 1121-112n, and a micro-processor (e.g., MCU) 1130. The plurality of sensors 1121-112n is configured to generate at least one sensing signal(s) S1-Sn. The application processor 1110 is configured to execute an application procedure according to a sensing-merged signal SF. The micro-processor 1130 is coupled between the plurality of sensors 1121-112n and the application processor 1110, and is configured to generate the sensing-merged signal SF according to the at least one sensing signal(s) S1-Sn.

The plurality of sensors 1121-112n mentioned above can be implemented by an accelerometer, a rotation sensor, a magnetometer, and/or an altimeter; however, this should not be a limitation of the present application. In addition, please note that a computing ability of the application processor 1110 is greater than a computing ability of the micro-processor 1130. For example, the application processor 1110 may be a multi-core baseband processor of a mobile phone, and the micro-processor 1130 may be a single chip micro-controller. Those skilled in the art should understand the difference(s) between the application processor 1110 and the micro-processor 1130 easily, and thus further description is omitted here for brevity.

Please note that, when the application processor 1110 of the electronic apparatus 100 of the present application gets into a sleep mode, the micro-processor 1130 is still working so as to maintain fundamental functions of the electronic apparatus 1100. As a result, even if the handheld electronic apparatus 1100 gets into the sleep mode, the application processor 1110 can be waked up through detecting motions of the electronic apparatus 1100. For example, when the application processor 1110 gets into the sleep mode, the application processor 1110 turns off a display module (not shown) of the electronic apparatus 1100, and locks a touch panel (not shown) of the electronic apparatus 1100. The locking mechanism of the electronic apparatus 1100 of the present application is listed below. Step (1): a user swings the electronic apparatus 1100, and motions and/or rotations of the electronic apparatus 100 are detected by the plurality of sensors 1121-112n so as to generate sensing signals S1-Sn, step (2) the sensing-merged signal SF, which can be used for waking up the application processor 1110, is then generated by the micro-processor 1130 according to the sensing signals S1-Sn, and step (3) the application processor 1110 receives the sensing-merged signal SF and then executes an application procedure according to the sensing-merged signal SF. For example, the application processor 1110 may compare the sensing-merged signal SF to see whether it corresponds to a specific gesture or not; and if the sensing-merged signal SF corresponds to the specific gesture, the abovementioned display module will be enabled and enter an unlocked status automatically. Therefore, the electronic apparatus 1100 does not need to have a physical button as the prior art, and the user does not need to press the physical button so as to unlock the electronic apparatus 1100. In addition, when the display module of the electronic apparatus 1100 is turned off, the application processor 1110 can continue to play back music. The electronic apparatus 1100 of the present application can generate motion data through detecting motions and/or rotations according to the plurality of sensors 1121-112n when the user swings the electronic apparatus 1100; and the micro-processor 1130 can process the motion data and then the application processor 1110 can control the played music. For example, the user can beat the left side of the electronic apparatus 1100 so as to select to play back a previous song, or beat the right side of the electronic apparatus 1100 so as to select to play back a next song.

On the other hand, another advantage of the present application is that: the function of the step counter, or pedometer, can still work after the application processor 1110 gets into the sleep mode. For example, when the application processor 1110 gets into the sleep mode and the electronic apparatus 1100 uses the function of the step counter, the sensor 1121 (such as an accelerometer) can generate the at least one sensing signal S1. The micro-processor 1130 can generate a counting information according to the at least one sensing signal S1 generated by the accelerometer. Please note that, in another embodiment of the present application, the micro-processor 1130 can set a default counting information, such as 1000 counts. That is to say, when the counting information is up to 1000 counts, the micro-processor 1130 can wake up the application processor 1110 by using the sensing-merged signal SF.

Figure 5:
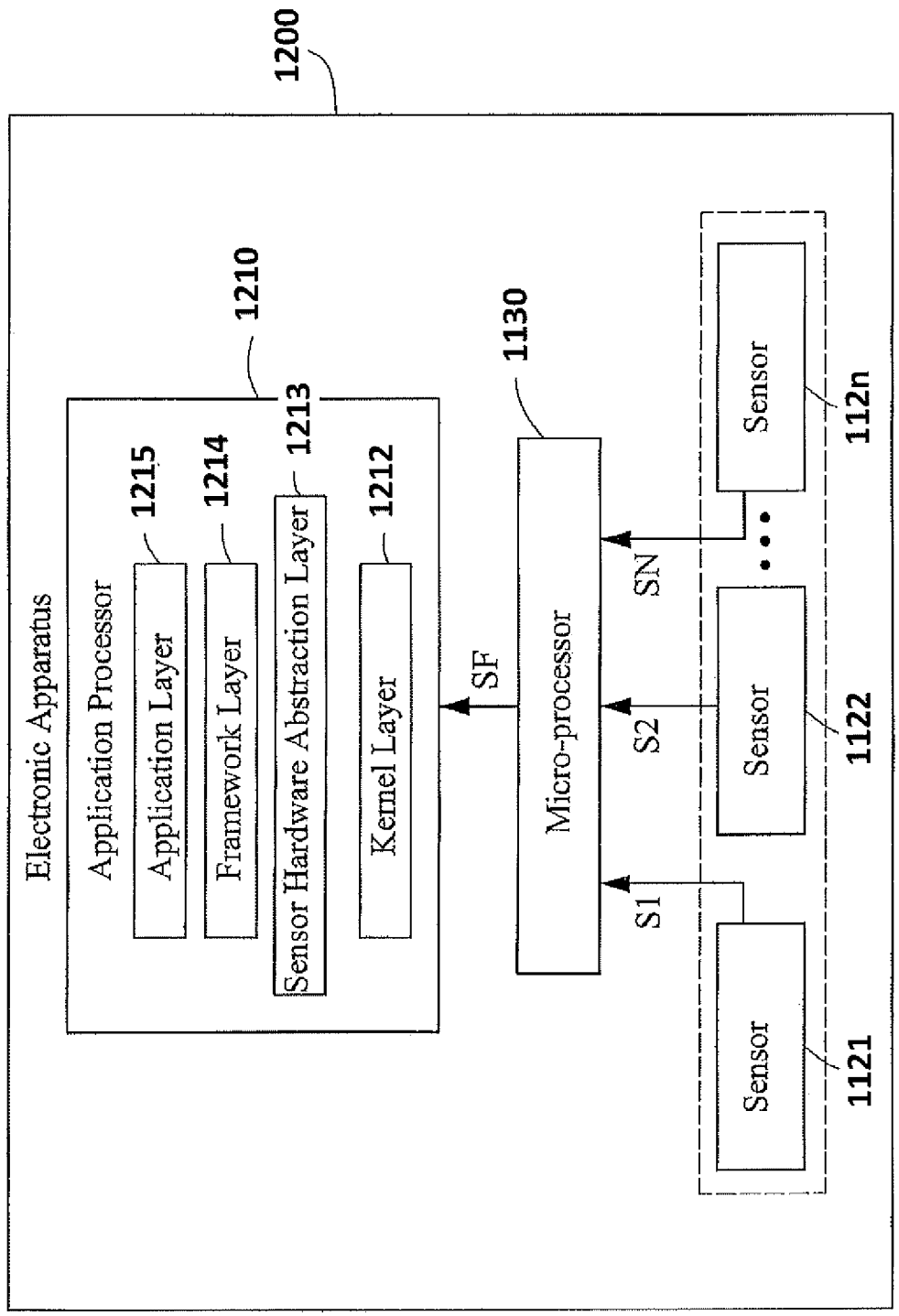
FIG. 5 is a diagram showing an electronic apparatus according to another embodiment of the present application.

Please refer to FIG. 5, which is a diagram showing an electronic apparatus 1200 according to a second embodiment of the present application. The electronic apparatus 1200 may include an application processor (AP or CPU) 1210, a micro-processor (e.g., MCU) 1130, and a plurality of sensors 1121-112n. The plurality of sensors 1121-112n mentioned above can be implemented by an accelerometer, a rotation sensor, a magnetometer, and/or an altimeter. The application processor 1210 may include a Kernel layer 1212, a sensor hardware abstraction layer (sensor HAL) 1213, a framework layer 1214, and an application layer 1215, wherein the application layer 1215 can be Android System's application layer. The micro-processor 1130 is disposed between the application processor 1210 and the plurality of sensors 1121-112n. The plurality of sensors 1121-112n will generate corresponding sensing signals S1-SN after sensing, and will transmit the sensing signals S1-SN to the micro-processor 1130. The micro-processor 1130 merges the sensing signals S1-SN generated by the plurality of sensors 1121-112n and then transmits a sensing-merged signal SF to the application processor 1210. The application processor 1210 executes a corresponding application procedure according to the sensing-merged signal SF. Please note that the communication between the application processor 1210 and the micro-processor 1130 is implemented by an internal integrated circuited port; and the communication between the micro-processor 1130 and the plurality of sensors is implemented by an internal integrated circuited port; however, this should not be a limitation of the present application.

The electronic apparatus 1100/1200 is characterized in that: the micro-processor 1130 can be selectively enabled or disabled to save power. For example, the plurality of sensors 1121-1212N may include an accelerometer, and the sensing signal generated by the accelerometer can be used for controlling enabling and disabling of the micro-processor 1130. In more detail, when the accelerometer generates an acceleration-related sensing signal, it represents that the electronic apparatus 1100/1200 is moving (for example, the sensing signal can be at a high level at this time) so as to enable the micro-processor 1130. After the micro-processor 1130 is enabled, it can merge the sensing signals S1-SN generated by the plurality of sensors 1121-112n to generate a sensing-merged signal SF according to an algorithm. The sensing-merged signal SF is then transmitted from the micro-processor 1130 to the application processor 1110/1210 in order to let the application processor 1110/1210 execute the corresponding application procedure.

The advantage of the configuration of the present application is determining whether to enable the micro-processor 1130 to save power by using characteristics of the plurality of sensors. For example, in the abovementioned embodiment, it can determine whether to enable the micro-processor 1130 by adopting the accelerometer sensor. In other words, the electronic apparatus 1100/1200 with such configuration can determine whether to enable the micro-processor 1130 to execute the corresponding application procedure to save power based on the motion detection itself.

Please note that, in one embodiment of the electronic apparatus 1100/1200 of the present application, the micro-processor 1130 and at least one of the plurality of sensors 1121-112n are not packed in a single chip, however, this should not be a limitation of the present application. Some of the plurality of sensors 1121-112n can be packed in a single chip. Furthermore, the micro-processor 1130 is independent with the application processor 1110/1210, and they are not packed in a single chip. Please note that driver programs of the plurality of sensors 1121-112n can be preloaded into the micro-processor 1130. Therefore, if a developer adopts the micro-processor 1130 of the present application, the sensing signals S1-SN of the plurality of sensors 1121-112n can be successfully processed. The advantage of the configuration of the present application is that the elasticity for choosing sensor chip vendors can be improved.

Figure 6:
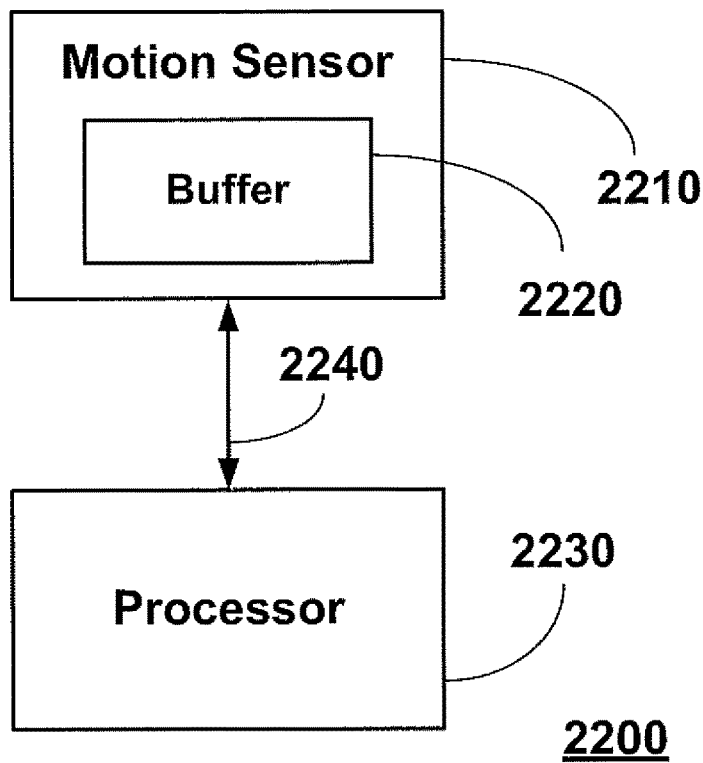
FIG. 6 is a schematic diagram showing an electronic device according to another embodiment of the present application.

FIG. 6 is a schematic diagram showing an electronic device 2200 according to an embodiment of the present application. The electronic device 2200 may be a smart phone, a personal digital assistant (PDA), a tablet computer, a remote control, or any other electronic device that can be moved and/or rotated. The electronic device 2200 includes a motion sensor 2210, a processor 2230, and a bus 2240. The motion sensor 2210 includes a buffer 2220. The processor 2230 is coupled to the motion sensor 2210 through the bus 2240.

Please note that the motion sensor may be a gyro-sensor, an accelerometer, a 6-axis motion sensor or a 9-axis motion sensor. In an embodiment of the present application, the motion sensor 2210 may be a gyro-sensor that detects and samples the angular velocity of the electronic device 2200. In another embodiment of the present application, the motion sensor 2210 may be an accelerometer that detects and samples the acceleration of the electronic device 2200. In another embodiment of the present application, the motion sensor 2210 may be a 6-axis motion sensor that detects and samples the acceleration or the angular velocity of the electronic device 2200. In another embodiment of the present application, the motion sensor 2210 may be a 9-axis motion sensor that detects and samples the acceleration, the angular velocity or the magnetism of the electronic device 2200. Those skilled in the art can readily understand 6-axis motion sensor comprises a 3-axis gyroscope and a 3-axis accelerometer, and further description is omitted here for brevity. Similarly, the 9-axis motion sensor comprises a 3-axis gyroscope, a 3-axis accelerometer and a 3-axis compass, and further description is omitted here for brevity. The buffer 2220 may be a first-in-first-out (FIFO) register that can store a plurality of samples produced by the motion sensor 2210. The processor 2230 may be the CPU, a microprocessor (e.g., MCU), or an embedded controller of the electronic device 2200.

Figure 7:
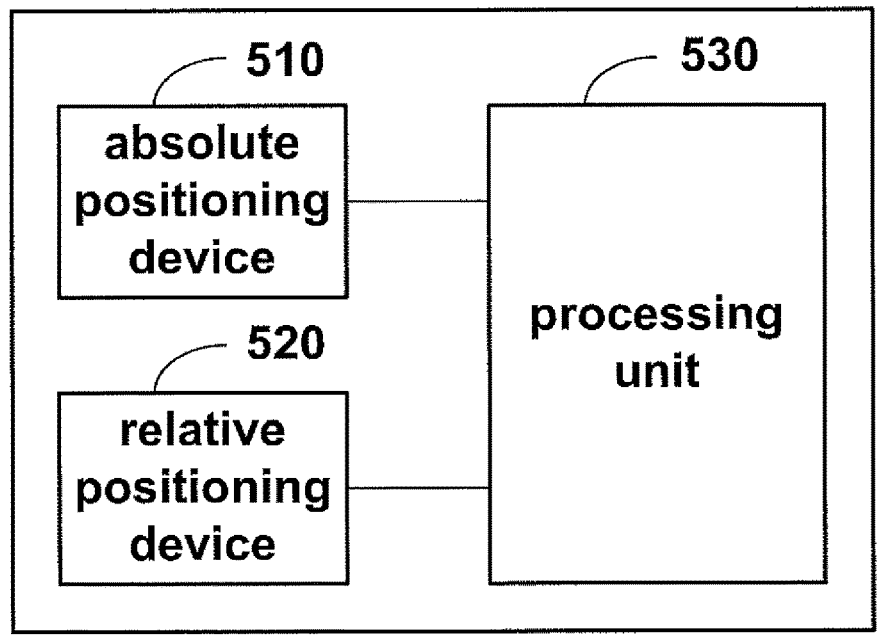
FIG. 7 illustrates a proposed electronic apparatus in accordance with an exemplary embodiment.

FIG. 7 illustrates a proposed electronic apparatus in accordance with another one of the exemplary embodiments of the disclosure. Referring to FIG. 7, for exemplary purposes, an electronic apparatus 500 at least includes an absolute positioning device 510, a relative positioning device 520, and a processing unit (which may include one or more of a CPU, AP or MCU) 530, where the processing unit 530 is coupled to the absolute positioning device 510 and the relative positioning device 520. The processing unit 530 could include a memory interface, one or more data processors, image processors and/or processors, and peripherals interface (or a sensor hub). Memory interface, one or more processors and/or peripherals interface can be separate components or can be integrated in one or more integrated circuits. Processors can include application processors, baseband processors, and wireless processors. The various components in the electronic apparatus 500, for example, can be coupled by one or more communication buses or signal lines. The electronic apparatus 500 could be a stand-alone apparatus such as a smart phone, a tabular computer, a person digital assistant (PDA), a smart watch, and so forth. The electronic apparatus 500 could also be a vehicle built-in apparatus.

The absolute positioning device 510 may sample location readings including readings from a GPS receiver that receives GPS satellite radio signals from a GPS satellite constellation via antennas and compute definite current location information of the electronic apparatus 500 based on the received signals in a manner which is well-known per se. The absolute positioning device 510 could provide location readings including readings from a communication module that could obtain the current location information of the electronic apparatus 500 through Wi-Fi or proximity tagging in a manner which is well-known per se as well. Based on the location readings, the absolute position device 510 can provide a geographical location and a geographical heading direction. The geographical location could be a point on a map, and the geographical heading direction could be a heading direction of the electronic apparatus 500 on the map. The geographical heading direction can be derived from at least two consecutive geographical locations moving on the map.

The relative positioning device 520 could include inertial sensors that detect events or changes in its position and provides a corresponding output in a relative basis. For exemplary purposes, in the present embodiment, the relative positioning device 520 may provide sensor readings including readings from at least one of an accelerometer, a gyroscope, a magnetometer, a pedometer, a barometer, a light sensor, a sound pressure sensor, or a radio receiver coupled to a sampling device. The sampling device samples strength of radio RF signals of a signal source that are detectable at the portion of a transit system. The signal source can be a cell site of a cellular communications network, a wireless access point, or a Bluetooth low energy (BLE) beacon. The sensor readings can include information about a rate of acceleration and deceleration, a motion speed, a change of direction, and/or a rate of direction change regarding to the electronic apparatus 500. For example, a three-axis accelerometer would output acceleration data corresponding to each axis in response to any detection of a sudden movement when the electronic apparatus 500 encounters an external force. A gyroscope would detect a rotational movement of the electronic apparatus 500 rotating about a particular axis in space and output data representing the rotational movement. A combination of the accelerometer and the gyroscope may create a more accurate measurement of an overall movement and orientation of the electronic apparatus 500.

The processing unit 530 could include one or more of a North Bridge, a South Bridge, a field programmable array (FPGA), a programmable logic device (PLD), an application specific integrated circuit (ASIC), or other similar device or a combination thereof. The processing unit 530 may also include a central processing unit (CPU), a programmable general purpose or special purpose microprocessor, microcontroller, a digital signal processor (DSP), an application specific integrated circuit (ASIC), a programmable logic device (PLD), or other similar devices or a combination thereof. In the present embodiment, the processing unit 530 may be a sensor hub electrically coupled to the absolute positioning device 510 and the relative positioning device 520 through, for example, a serial peripheral interface bus (SPI) or inter integrated circuits (I2C). The processing unit 530 is configured to integrate and process data obtained from the absolute positioning device 510 and the relative positioning device 520 so as to perform the proposed hybrid positioning method.

Figure 8:
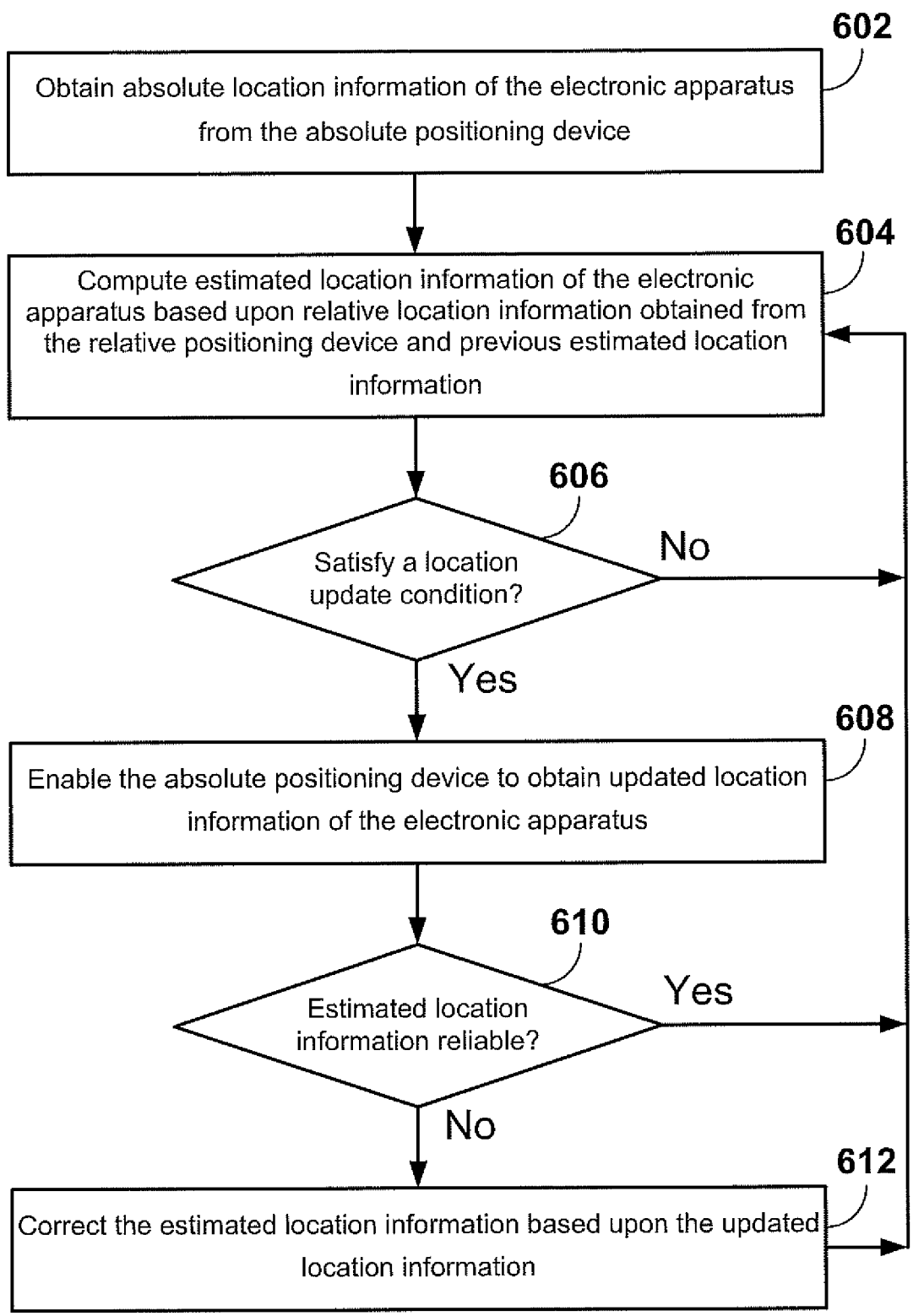
FIG. 8 illustrates a flowchart of a proposed hybrid positioning method in accordance with an exemplary embodiment.

FIG. 8 illustrates a flowchart of a proposed hybrid positioning method in accordance with one of the exemplary embodiments of the disclosure. The steps of FIG. 8 could be implemented by the proposed electronic apparatus 500 as illustrated in FIG. 7.

Referring to FIG. 7 in conjunction with FIG. 8, the processing unit 530 would first obtain absolute location information, which could include a geographical location and a geographical heading direction from the absolute positioning device 510 (Step S602). Once the absolute location information is obtained, the processing unit 530 could stop requesting location readings from the absolute positioning device 510. The term "absolute" location refers a point on the earth's surface expressed by a coordinate system such as latitude and longitude. The processing unit 530 can take the geographical location as a reference location or a current location if it is determined to be reliable. In detail, once the hybrid positioning method starts, the processing unit 530 would first obtain a current location of the electronic apparatus 500 as a reference point or a starting point on the map. The current location would be determined based upon a set of close/converged geographical locations. That is, if any obtained geographical location is way off as compared to other geographical location obtained within a certain time frame, it could be an error impacted by temporary interferences or noises and would not be considered as a stable geolocation measurement. Once the current geographical location of the electronic apparatus 500 is determined, the absolute location information could be determined. A geographical heading direction can also be determined by comparing changes of geographical locations calculated when the electronic apparatus is traveling. Meanwhile, the processing unit 530 could disable, stop requesting, or reduce the frequency of sampling location readings from the absolute positioning device 510 for power saving purposes.

While the electronic apparatus 500 is travelling, the processing unit 530 would compute, based on the sensor readings from the relative positioning device 520, relative location information which could include an estimated moving distance and an estimated rotating angle. The estimated moving distance could refer to a step length, and the estimated rotating angle could refer to an angle between the current heading direction and the previous heading direction of the electronic apparatus 500. Based on the relative location information, the processing unit 530 can compute estimated location information, which could include an estimated location and an estimated heading direction of the electronic apparatus 500 based upon the relative location information obtained from the relative positioning device 520 and the absolute location information (Step S604).

The processing unit 530 would determine whether the electronic apparatus satisfies a location update condition (Step S606). The location update condition could be associated with a travelling distance of the electronic apparatus 500 from a location where the absolute positioning device 510 was previously enabled, a cumulative time that the electronic apparatus 500 has not been traveling, a moving direction of the electronic apparatus 500, etc. For example, the processing unit 530 could enable or start requesting location readings from the absolute position device 510 every certain travelling distance of the electronic apparatus 500 (e.g., every 0.5 km) so as to obtain its updated geographical location and/or geographical heading direction. In other instances, when electronic apparatus 500 has been traveling for more than a certain time period (e.g., 3 minutes), or when the electronic apparatus 500 makes a turn of more than a predetermined angle (e.g., 45 degrees), its location information would need to be updated. The location update condition could be determined based upon the measurements of the inertial sensors implemented as the relative positioning device 520.

If the electronic apparatus 500 does not satisfy the location update condition, the flow would directly return to Step S604. The processing unit 530 would continuously estimate the current estimated location information of the electronic apparatus 500 based on a pedestrian dead reckoning (PDR) algorithm. The PDR algorithm involves calculating the current estimated location information based upon relative location information obtained from the relative positioning device 520 and the previous absolute location information.

On the other hand, when the electronic apparatus 500 determines that the location update condition is satisfied, the processing unit 530 would enable the absolute positioning device 510 to obtain updated absolute location information of the electronic apparatus 500 (Step S608). Similar to Step 602, once the absolute location information is obtained, the processing unit 530 could stop requesting location readings from the absolute positioning device 510.

Next, the processing unit 530 would determine whether the estimated location information is reliable (Step S610). The determination of the reliability could be based upon the differences in location and heading direction between the estimated location information and the updated location information. If the estimated location information is determined unreliable, the processing unit 530 would correct the estimated location information based upon the updated location information (Step S612), and the flow would return to Step 604. On the other hand, if the estimated location information is determined reliable, the processing unit 530 would not correct the estimated location information, and the flow would directly return to Step S604.

Figure 9A:
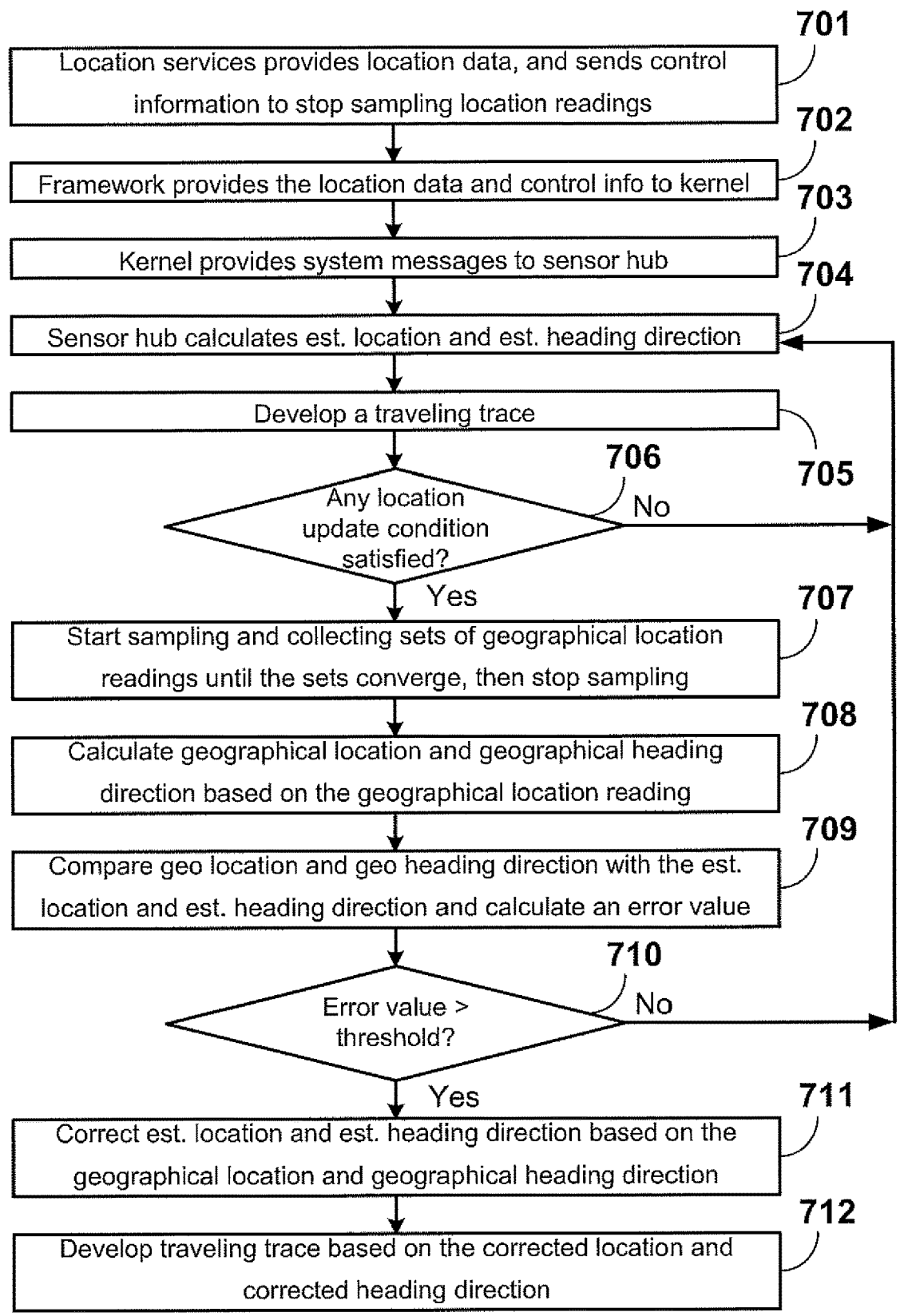
FIGS. 9A and 9B illustrate a flowchart of an application scenario of a hybrid positioning method in accordance with an exemplary embodiment.

For a better understanding, FIG. 9A illustrates a flowchart of an application scenario of a hybrid positioning method in accordance with one of the exemplary embodiments of the disclosure. The steps of FIG. 9A could also be implemented by the proposed electronic apparatus 500 as illustrated in FIG. 9. In this exemplary embodiment, the absolute positioning device 510 would be a GPS device, and the relative positioning device 520 would be a PDR device including inertial sensors.

Referring to FIG. 9 in conjunction with FIG. 9A, the processing unit 530 would first obtain geographical GPS data of the electronic apparatus 500 from the GPS device. Processing unit 530 could enable a location service program to provide location data and send control information to stop sampling location readings (Step S701). The processing unit 530 could compute the location data to obtain a reference location and a reference heading direction of the electronic apparatus 500. Framework then could provide the location data and control information to kernel (Step S702). Kernel could provide system messages to sensor hub (Step S703). Processing unit 530 could set the reference location as a previous location. After the electronic apparatus 500 is moving, the processing unit 530 could accumulate the estimated moving distance and estimated rotating angle for each following steps, and based on the previous location, to calculate an estimated location and an estimated heading direction (Step S704). The processing unit 530 could develop a traveling trace based on a plurality of estimated location and/or estimated heading direction for each following steps (Step S705). While the electronic apparatus 500 is travelling, the processing unit 530 would determine whether any location update condition is satisfied (Step S706). The location update conditions could include whether a traveling distance of the electronic apparatus 500 from the previous location where the location service program was previously enabled is greater than a distance threshold. The location update condition could include whether a not-traveling time that the electronic apparatus 500 has been staying at the same location exceeds a predetermined time period. When the not-traveling time exceeds the predetermined time period, the electronic apparatus 500 might be on a moving vehicle in which the processing unit 530 might not be able to differentiate between staying status and on-vehicle status based on the sensor readings from the relative positioning device 520. The location update condition could include whether the electronic apparatus 500 makes a turn of more than a predetermined angle (not shown). If all of the location update conditions are not satisfied, the processing unit 530 would continue to perform Step S704.

If any of the location update conditions is satisfied, the processing unit 530 would start to request location readings from the absolute positioning device 510, such as by enabling the location service program to start sampling and collecting a plurality of sets of location readings until, for example, 5 sets of location readings indicate measured locations have converged. The location service program could then stop sampling the location readings (Step S707).

Next, the processing unit 530 could calculate geographical location and geographical heading direction based on the location readings (Step S708). The processing unit 530 could compare the calculated geographical location and the geographical heading direction with the estimated location and the estimated heading direction to calculate an error value (Step S709). The error value could indicate whether the estimated location is away from the geographical location over a threshold offset and/or the estimated heading direction deviates from the geographical heading direction over a threshold angle. The processing unit 530 could determine whether the error value exceeds a threshold (Step S710). If "no", the processing unit 530 would determine that the estimated location and the estimated heading direction are still reliable and continue to perform Step S704. If "yes", the processing unit 530 would correct the estimated location and the estimated heading direction based on the geographical location and geographical heading direction (Step S711). Based on the correction, the processing unit 530 could obtain a corrected location and a corrected heading direction. Accordingly, the processing unit could develop a corrected traveling trace based on the corrected location and the corrected heading direction (Step S712).

Figure 9B:
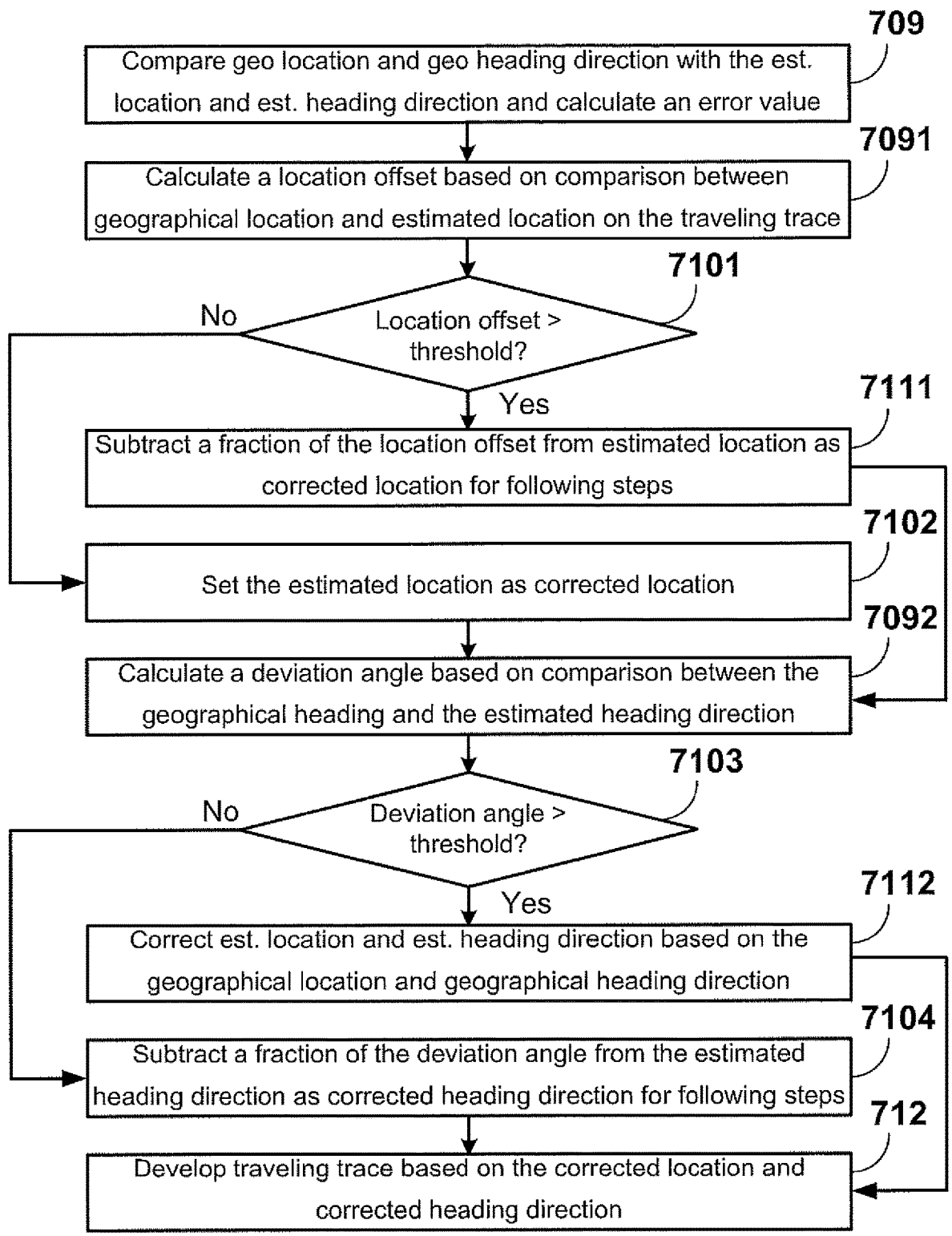

FIG. 9B illustrates a detail flowchart of method Step S709 to Step 712 of FIG. 9A. In Step S709, the processing unit 530 could compare the calculated geographical location and the geographical heading direction with the estimated location and the estimated heading direction to calculate the error value. The processing unit 530 could calculate a location offset based on a comparison between the geographical location and the last estimated location on the traveling trace (Step S7091). The processing unit 530 could determine whether the value of the location offset exceeds the threshold offset (Step S7101). If "yes", the processing unit 530 could subtract a fraction (i.e., a portion) of the location offset from the estimated location calculated in Step S705 to obtain a corrected location for following steps (Step S7111). The processing unit 530 calculates a deviation angle based on a comparison between the geographical heading direction and the estimated heading direction (Step S7092). The deviation angle refers to the angle between the estimated heading direction and the measured geographical heading direction. If the location offset is determined to be smaller than the threshold offset, the processing unit 530 could set the estimated location as the corrected location (Step S7102) and then move to Step S7092.

In Step 7103, the processing unit could determine whether the deviation angle is greater than a deviation threshold. If "yes", the processing unit 530 could subtract a fraction (i.e., a portion) of the deviation angle from the estimated rotating angle calculated in Step S705 to obtain a corrected heading direction for following steps (Step S7112). Accordingly, the processing unit 530 could develop a corrected traveling trace based on the corrected location and the corrected heading direction. If the deviation angle is determined to be smaller than the deviation threshold, the processing unit 530 could set the estimated heading direction as the corrected heading direction (Step S7104) and then move to Step S712.

FIGS. 10A-10D illustrate different scenarios of how the processing unit 530 corrects the estimated location information in Step S612 or Step S722 in accordance with one of the exemplary embodiments of the disclosure.

Figure 10A:
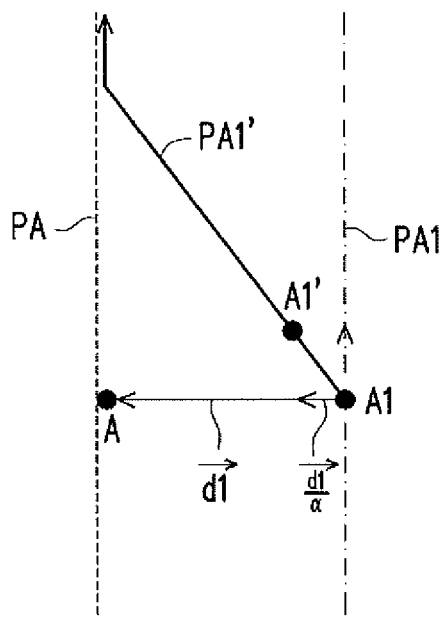
FIGS. 10A-10D illustrate different scenarios of how the processing unit corrects the estimated location information in accordance with an exemplary embodiment.

Referring to FIG. 10A, assume that at time point t, a GPS position A and an estimated position A1 are at the same latitude, and yet there exists an offset $\vec{d1}$ between the two positions, where the magnitude of $\vec{d1}$ is greater than a predetermined distance tolerance. It should be noted that, in the present embodiment, the processing unit 530 would not correct the estimated position A1 by adding the offset $\vec{d1}$ thereto in a single step otherwise there could exist spikes in the tracking path of all estimated positions. Hence, in order to smooth out such fluctuation, the processing unit 530 would correct the estimated position A1 by only a fraction of the offset $\vec{d1}$ (e.g., by $$\frac{1}{\alpha},$$

α could be a predetermined or a dynamically modified value). For example, in this case, the processing unit 530 would correct the estimated position A1 by adding $$\frac{\vec{d1}}{\alpha}$$

thereto, and a position A1' would be the corrected estimated position. The processing unit 530 would correct other estimated positions by adding $$\frac{\vec{d1}}{\alpha}$$

thereto at each time point t+1, t+2, . . . in a similar fashion until the GPS position is updated again or until an offset between the estimated position and the GPS position is within the predetermined tolerance. Assume that PA is a tracking path of all GPS positions (given that the GPS device is turned on all the way), and PA1 is a tracking path of the estimated positions. Since the corrected estimated positions (i.e., a tracking path PA1') have been corrected in a stepwise fashion, a much more accurate and smooth estimation would be produced.

Figure 10B:
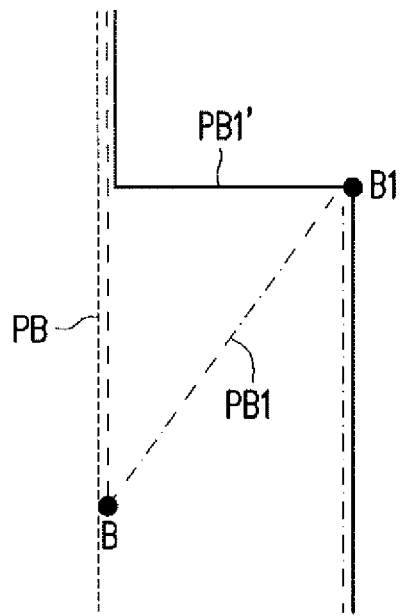

Referring to FIG. 10B, assume that at time point t, a GPS position B is behind an estimated position B1, and PB is a tracking path of all GPS positions (given that the GPS device is turned on all the way). Note that "behind" in this context refers to a relationship between B and B1 in which B is located rearward of B1 with reference to a direction of travel along the tracking path PB. The processing unit 530 would correct all estimated positions corresponding to time points t+1, t+2, . . . so that a corrected tracking path PB1' formed by the corrected estimated positions would be much smoother to the tracking path PB as compared to a tracking path PB1 formed by the estimated positions.

Figure 10C:
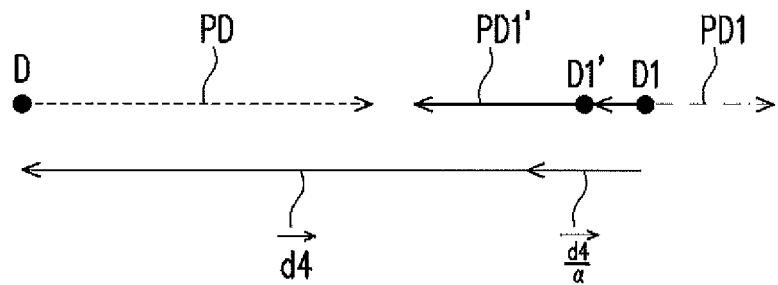

Referring to FIG. 10C, assume that at time point t, a GPS position D and an estimated position D1 are at the same latitude, and yet there exists an offset $\vec{d4}$ between the two positions, and the electronic apparatus 500 moves toward an opposite way of the GPS position D. In this case, the processing unit 530 would correct the estimated position D1 by subtracting a fraction of the offset $\vec{d4}$ $$\left(e.g., by \frac{1}{\alpha}\right)$$

therefrom so that a corrected estimated position D1' would be much closer to the GPS position D. The trace PD1' illustrates the corrected trace over a time period after the correction process starts. The processing unit 530 would correct other estimated positions at time points t+1, t+2, . . . in a similar fashion until the GPS position is updated again or until an offset between the estimated position and the GPS position is within the predetermined tolerance.

Figure 10D:
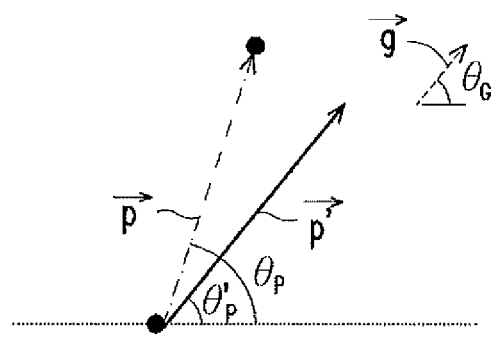

It should be noted that, the processing unit 530 would also correct the estimated position based on the GPS heading direction. For example, as illustrated in FIG. 10D, if a PDR direction $\vec{p}$ and a heading direction $\vec{g}$ respectively have an angle of $\theta_P$ and $\theta_G$. The processing unit 530 would correct the estimated position by shifting an angle more toward the GPS heading direction (e.g. a direction $\vec{p'}$ with an angle $\theta'_G$).

Figure 11:
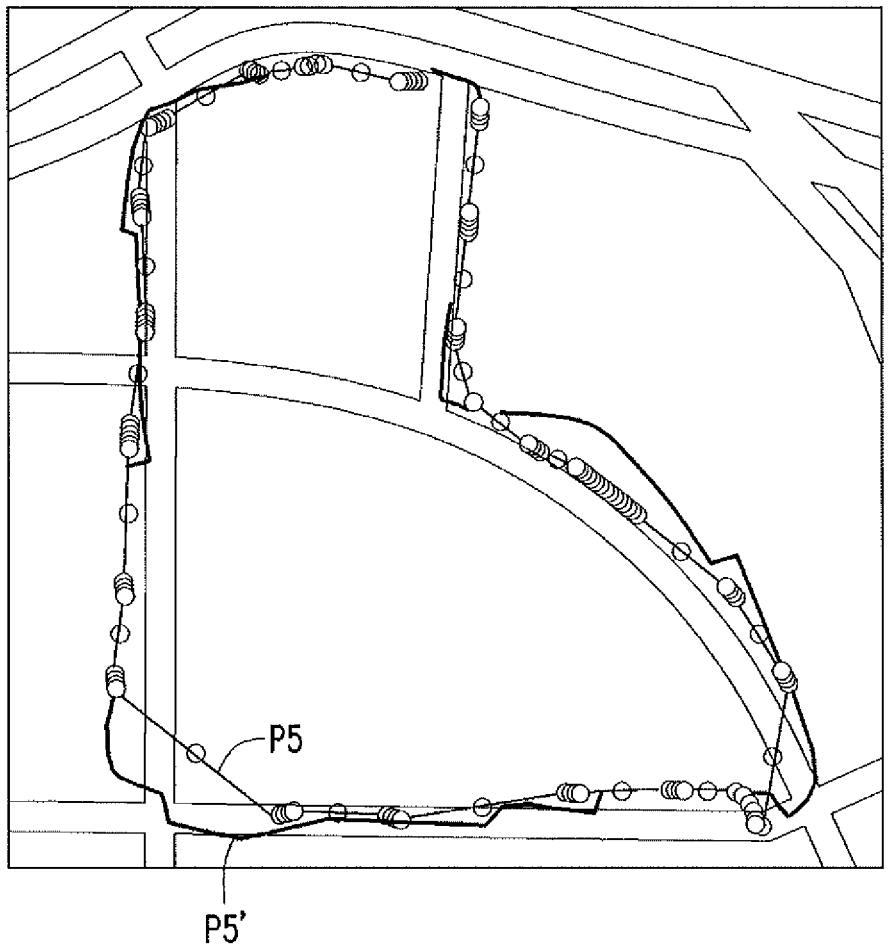
FIG. 11 illustrates a comparison of a GPS path positioned by a GPS device and an experimental outcome of an estimated path formed by an exemplary embodiment.

FIG. 11 illustrates a comparison of a GPS path P5 positioned by a GPS device and an experimental outcome of an estimated path P5' formed by the proposed electronic apparatus 500 to prove that the proposed hybrid position method is able to maximize accuracy and coverage for positioning while keeping power draw to a minimum.

Figure 12:
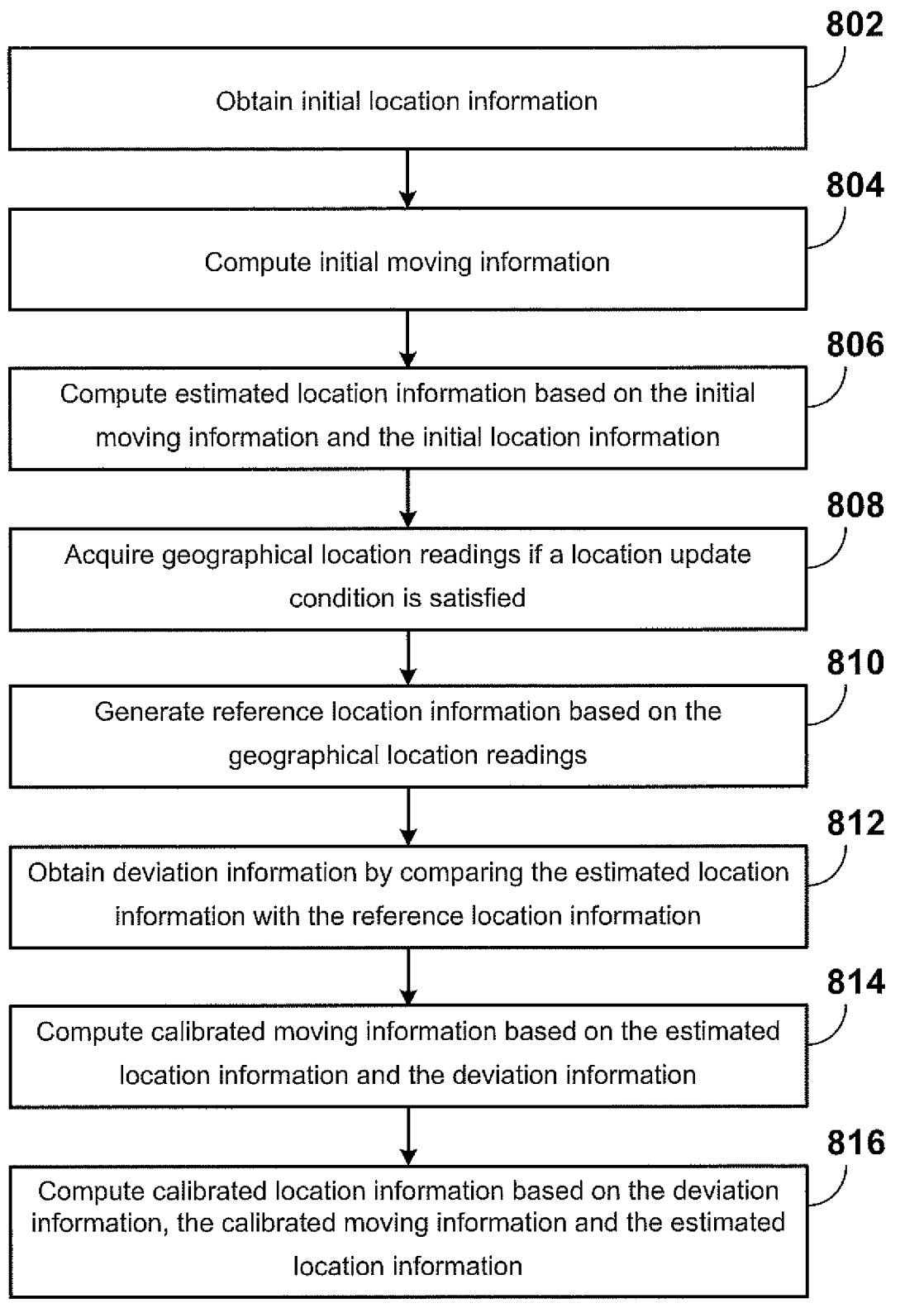
FIG. 12 illustrates a flowchart of a hybrid positioning method in accordance with another exemplary embodiment.

FIG. 12 illustrates a flowchart of a hybrid positioning method in accordance with another exemplary embodiment. In particular, the hybrid positioning method may be employed by an electronic apparatus capable of collecting geographical location readings (e.g., readings from a GPS receiver) and sensor readings (e.g., readings from at least one of an accelerometer, a gyroscope, a magnetometer, a pedometer, a barometer, a light sensor, a sound pressure sensor, or a radio receiver coupled to a sampling device) associated with the electronic apparatus. As shown in FIG. 12, the method 800 may be construed as beginning at block 802, in which initial location information, which may include information indicative of heading as well as location, is obtained. In some embodiments, this may involve the use of location information used as the current location, thus emphasizing the iterative nature of the method. In block 804, initial moving information is computed based upon the sensor readings. The initial moving information may include information corresponding to a change in distance between PDR position readings and a change in angle of heading. Then, as depicted in block 806, estimated location information is computed based on the initial moving information and the initial location information.

In block 808, if a location update condition is satisfied, geographical location readings are acquired. In some embodiments, the location update condition is satisfied when at least one of: a distance value, distance-turn values, or a time value corresponds to a distance threshold, a distance-turn threshold, or a time threshold, respectively. By way of example, a distance threshold could be a PDR distance (e.g., a distance greater than 15 feet traversed in a straight line—no change in angle of heading or turn angle), and a distance-turn threshold could be a PDR distance and an associated change in angle of heading (e.g., a distance greater than 3 feet, with a change in angle of heading of greater than 2 degrees). Notably, the distance threshold, which corresponds to a straight line distance, is typically longer than the distance component of the distance-turn threshold. As another example, a time threshold (e.g., a time greater than 1 minute), may correspond to a time duration beginning when the geographical location readings were last updated (i.e., GPS wait time).

In block 810, reference location information is generated based on the geographical location readings that were acquired. In some embodiments, this may involve updating the previous GPS location with the current GPS location, as well as calculating a GPS heading. Calculation of the GPS heading may include providing a current value for PDR heading, adding the previous GPS heading value and then subtracting the previous PDR heading value.

As depicted in block 812, the estimated location information is compared with the reference location information to obtain deviation information. The deviation information may include one or more of a location offset, a heading deviation, and a length factor. In particular, location offset may be calculated by comparing estimated location and reference location from the estimated location information and reference location information, respectively. Thus, in some embodiments, location offset may be represented by: dis_diff=square root of {Algo_output_location_x (current)−Algo_previous_GPS location_x, Algo_output_location_y (current)−Algo_previous_GPS location_y}.

Similarly, heading deviation may be calculated by comparing estimated heading with reference heading from the estimated location information and reference location information, respectively. Thus, in some embodiments, heading deviation may be represented by: theta_diff=Angle of (Algo_ current heading−GPS_current heading).

With respect to length factor, this parameter relates to the relationship between a presumed accurate moving speed, which PDR should use to calculate a moving distance, and uncalibrated moving speed, which PDR is based on. PDR generally uses step count as calculated by a pedometer (based on sensor data from an accelerometer) and moving speed previously calculated or defined for each step to calculate moving distance over each time cycle or algorithm call (e.g., 1 second according to a typical GPS update rate). Since different people exhibit different moving speeds (and even the same person moves at different speeds over time depending on the type of activity, for example), moving speed may be updated periodically. This is accommodated by length factor. In some embodiments, length factor is calculated by determining an actual moving distance over each call based on GPS location updates. Thus, in some embodiments, length factor may be represented by: length_factor=((GPS(t5)−GPS(t4))*((GPS(t5)−GPS(t4))/((PDR (t5)−PDR(t4))*((PDR(t5)−PDR (t4)). Then, the moving distance as determined by PDR may be compared to the moving distance determined by GPS to calculate the length factor, which is used to calibrate PDR moving speed.

Then, in block 814, calibrated moving information is computed based on the estimated location information and the deviation information, thereby providing a refined PDR length corresponding to the move distance for each step. Calibrated location information is computed based on the deviation information, calibrated moving information and the estimated location information in block 816.

With reference to block 804, in some embodiments, the initial moving information includes an initial moving distance and an initial heading change, the calibrated moving information includes a smooth amount, a smooth count and a smooth angle, and the calibrated location information includes a calibrated location and a calibrated heading. In such an embodiment the smooth count (which corresponds to a number of steps required for sensor hub correction) may be calculated based on the location offset, and the smooth angle (which also corresponds to sensor hub correction) may be calculated based on the deviation angle and the smooth count. Computing of the calibrated heading may be based on the smooth angle and the initial heading, whereas computing of the estimated location may be based on the initial location and the calibrated heading. Additionally, calculating of the smooth amount based on the deviation information and the smooth count, and computing the calibrated location may be based on the smooth amount and the estimated location.

Referring back to block 808, the geographical location readings of some embodiments may include a sequence of geographical location readings, whereas the estimated location information may include an estimate location and an estimated heading. In such an embodiment, a variance may be calculated among the sequence of geographical location readings, with a last one of the sequence of geographical location readings being stored as a reference location if the variance is smaller than a variance threshold. Additionally, at least two of the geographical location readings may be compared to obtain a reference heading, and the estimated location information may be compared with the reference location information to obtain the deviation information, such as in block 812. Specifically, the deviation information includes a location offset (which is calculated by comparing estimated location and reference location) and a heading deviation (which is calculated by comparing estimated heading with reference heading).

In other embodiments, wherein the geographical location readings include a sequence of location readings, at least two of the sequence of geographical location readings may be selected. At least two previous estimated locations are computed, with each of the at least two of the sequence of location readings being synchronized with the at least two previous estimated locations. Length factor is then calculated by comparing the at least two previous estimated locations and the selected at least two of the sequence of location readings, and the calibrated moving information is computed based on the length factor.

In some embodiments, a reference geographical coordinate may be obtained according to the reference location, and the calibrated location may be transformed to calibrated geographical longitude and latitude based on the reference geographical coordinate. It should also be noted that, in some embodiments, an error value may be calculated based on accuracy of the geographical location readings, with the accuracy being determined based on readings from a GPS receiver that receives GPS satellite radio signals from a GPS satellite constellation via antennas.

As mentioned above, a hybrid positioning method may be implemented by an electronic apparatus (such as depicted in FIG. 7) that incorporates a processing unit with processing circuitry, an absolute positioning device with circuitry and configured to determine an absolute position, and a relative positioning device with sensors and configured to determine a relative position of the electronic device. With such an apparatus, the processing unit may be operated in an always-on mode to periodically fetch sensor readings from the relative positioning device, while the absolute positioning device is operated in a power-saving mode. So configured, if initial moving information corresponds to a location update condition, the absolute positioning device may be switched into a location information-acquiring mode by the processing unit. After reference location information has been calculated by the processing unit, the absolute positioning device may be switched back into the power-saving mode. It should be noted that the time interval for maintaining the absolute location device in the location information-acquiring mode typically is substantially smaller than the time interval during which the processing unit fetches sensor readings from the relative positioning device so as to reduce power consumption.

Figure 13A:
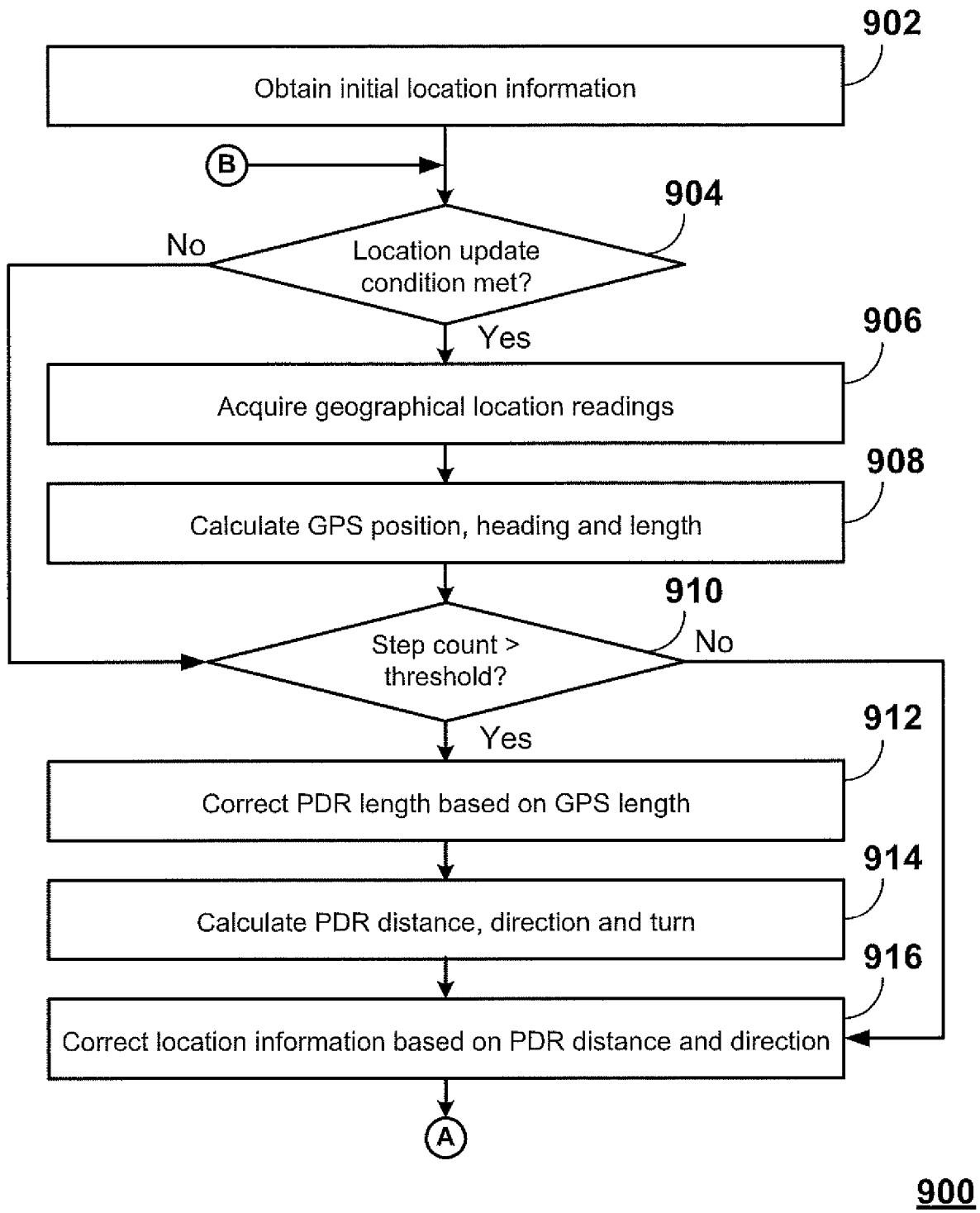
FIGS. 13A and 13B illustrate a flowchart of a hybrid positioning method in accordance with another exemplary embodiment.
Figure 13B:
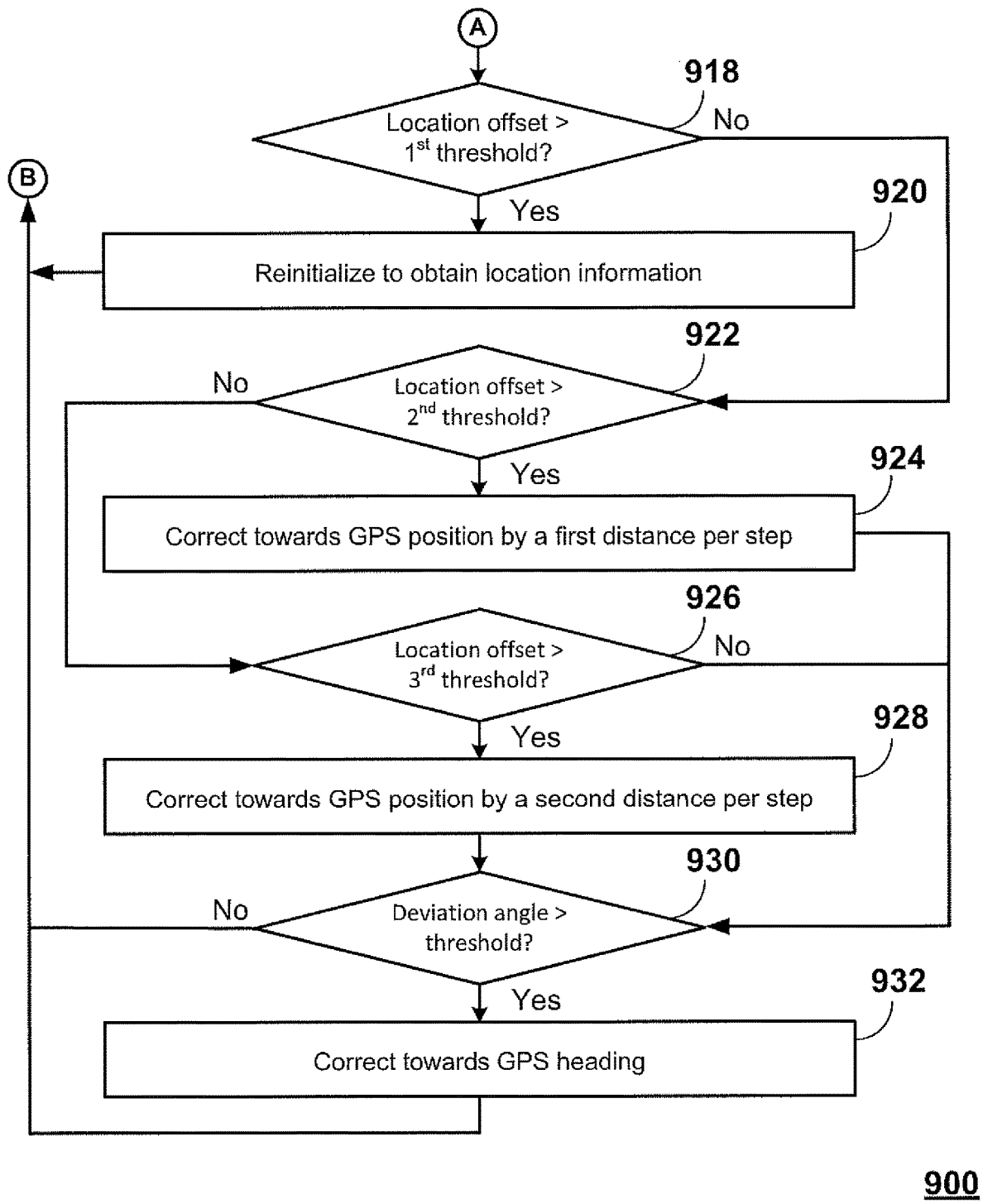

FIGS. 13A and 13B illustrate a flowchart of a hybrid positioning method in accordance with another exemplary embodiment. In particular, the hybrid positioning method may be employed by an electronic apparatus capable of collecting geographical location readings and sensor readings associated with the electronic apparatus.

Beginning the description with reference to FIG. 13A, the method 900 may be construed as beginning at block 802, in which initial location information is obtained. By way of example, this may include collecting a set of GPS information (e.g., a set of five readings) and selecting one of the readings to use if determined to be accurate. In block 904, a determination is made as to whether a location update condition is met. In some embodiments, this may include one or more of various threshold comparisons, such as determining whether a non-straight walking distance corresponds to a first threshold (e.g., 3 meters), whether a straight line walking distance corresponds to a second threshold (e.g., 15 meters), or whether a time (e.g., 5 minutes) has elapsed without movement. If the update condition is met, the process may proceed to block 906.

At block 906, geographical location readings are acquired (e.g., 5 GPS readings are taken). Then, the process proceeds to lock 908, in which GPS position, heading and length are calculated. In some embodiments, the last GPS reading may be used once accuracy of the reading has been assessed. The method then proceeds to block 910, in which a determination is made as to whether a step count corresponds to a threshold. For instance, the step count may be set to 8 steps, among numerous others. Note that the process also may proceed to block 910 in response to determining that a location update condition was not met in block 904.

If the step count corresponds to the threshold, the process proceeds to block 912, in which PDR length is corrected based on the GPS length. Then, in block 914, PDR distance, direction and turn are calculated. Thereafter, the process proceeds to block 916, in which location information is corrected based on PDR distance and direction. Note also that location information is corrected if the determination is made in block 910 that step count has not exceeded the threshold.

With reference to FIG. 13B, a smoothing function is depicted. In particular, after block 916 (FIG. 13A), the process proceeds to block 918, in which a determination is made as to whether a location offset corresponds to a first offset threshold (e.g., 500 meters). If the location offset corresponds to the first offset threshold, the process proceeds to block 920, in which the procedure for obtaining location information is reinitialized and the process flow returns to block 904 as indicated. If, however, the location offset does not correspond to the first offset threshold, the process proceeds to block 922, in which a determination is made as to whether the location offset corresponds to a second offset threshold (e.g., 30 meters). If the location offset corresponds to the second offset threshold, the process proceeds to block 924, in which the location information is corrected towards the GPS position by a first distance per step (e.g., 5 meters per step). If, however, the location offset does not correspond to the second offset threshold, the process proceeds to block 926.

In block 926, a determination is made as to whether the location offset corresponds to a third offset threshold (e.g., 10 meters). If the location offset corresponds to the third offset threshold, the process proceeds to block 928, in which the location information is corrected towards the GPS position by a second distance per step (e.g., 0.5 meters per step). If, however, the location offset does not correspond to the second offset threshold, the process proceeds to block 930. Note also that the process may proceed to block 930 after block 924 and after determining in block 926 that the location offset does not correspond to the third offset threshold.

In block 930, a determination is made as to whether a deviation angle corresponds to a threshold (e.g., 3 degrees). If the deviation angle corresponds to the threshold, the process proceeds to block 932, in which the location information is corrected towards the GPS heading, such as by 30%. The process may then return to block 904 and proceed as described before. Additionally, the process may proceed to block 904 after correcting towards the GPS heading in block 932.

The disclosure also provides a non-transitory computer readable medium, which records computer program to be loaded into an electronic apparatus to execute the steps of the proposed method. The computer program is composed of a plurality of program instructions (for example, an organization chart, establishing program instruction, a table approving program instruction, a setting program instruction, and a deployment program instruction, etc), and these program instructions are loaded into the electronic apparatus and executed by the same to accomplish various steps of the proposed method.

Advantages of the proposed method may include, but are not limited to, maximizing accuracy and coverage for positioning and providing a smooth traveling trace on a map while keeping power consumption to a minimum through the integration of the two aforesaid techniques.

No element, act, or instruction used in the detailed description of disclosed embodiments of the present application should be construed as geographically critical or essential to the disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A hybrid positioning method for an electronic apparatus configured as a wearable mobile device having an absolute positioning device, a relative positioning device and a display device, the absolute positioning device having a GPS receiver and being configured to collect geographical location readings of the electronic device, the relative positioning device being configured to collect sensor readings associated with movement of the electronic apparatus, the method comprising:

obtaining initial location information of the electronic apparatus;

computing initial moving information of the electronic apparatus based upon the sensor readings;

computing estimated location information based on the initial moving information and the initial location information, wherein the estimated location information comprises an estimate location and an estimated heading;

acquiring geographical location readings responsive a location update condition being satisfied, wherein the geographical location readings comprise a sequence of geographical location readings;

generating reference location information based on the geographical location readings acquired;

calculating a variance among the sequence of geographical location readings;

storing a last one of the sequence of geographical location readings as a reference location if the variance is smaller than a variance threshold;

comparing at least two of the geographical location readings to obtain a reference heading;

comparing the estimated location information with the reference location information to obtain a deviation information, wherein the deviation information comprises a location offset and a heading deviation, which are calculated by comparing estimated location and reference location, and comparing estimated heading with reference heading, respectively;

computing a calibrated moving information based on the estimated location information and the deviation information;

computing a calibrated location information based on the deviation information, calibrated moving information and the estimated location information; and displaying the calibrated location information with the display device.

2. The method of claim 1, further comprising:
comparing the initial location information and the estimated location information;
computing a difference between the initial location information and the estimated location information;
determining whether the location update condition is satisfied based on the difference;
wherein the location update condition is satisfied when at least one of: a distance value, distance-turn values, or a time value corresponds to a distance threshold, a distance-turn threshold, or a time threshold, respectively.

3. The method of claim 2, wherein:
the distance-turn threshold corresponds to a distance component and a turn angle; and
the distance threshold, which corresponds to a straight line distance, is longer than the distance component of the distance-turn threshold.

4. The method of claim 2, wherein the time threshold corresponds to a time duration beginning when the geographical location readings were last updated.

5. The method of claim 1, wherein the initial moving information comprises an initial moving distance and an initial heading change, the calibrated moving information comprises a smooth amount, a smooth count and a smooth angle, the calibrated location information comprises a calibrated location and a calibrated heading and the method further comprises:
calculating a smooth count based on the location offset;
calculating a smooth angle based on the deviation angle and the smooth count;
computing the calibrated heading based on the smooth angle and the estimated heading;
computing the estimated location based on the initial location and the calibrated heading;
calculating a smooth amount based on the deviation information and the smooth count; and
computing the calibrated location based on the smooth amount and the estimated location.

6. The method of claim 5, wherein the geographical location readings comprise a sequence of location readings, and the method further comprises:
selecting at least two of the sequence of geographical location readings;
computing at least two previous estimated locations, wherein each of the at least two of the sequence of location readings synchronize with the at least two previous estimated locations;
calculating a length factor by comparing the at least two previous estimated locations and the selected at least two of the sequence of location readings; and
computing the calibrated moving information based on the length factor.

7. The method of claim 5, further comprising forming a traveling trace based on a sequence of the calibrated location.

8. The method of claim 1, further comprising:
obtaining a reference geographical coordinate according to the reference location; and
transforming the calibrated location to calibrated geographical longitude and latitude based on the reference geographical coordinate.

9. The method of claim 1, wherein:
computing calibrated location information further comprises determining whether the reference location is behind the estimated location in view of the estimated heading; and
if the reference location is behind the estimated location in view of the estimated heading, applying to the estimate location a component of the location offset, which is a difference between the estimated location and the reference location, with the component being orthogonal to a direction of the estimated heading.

10. The method of claim 1, further comprising calculating an error value based on accuracy of the geographical location readings, wherein the accuracy is determined based on readings from the GPS receiver that receives GPS satellite radio signals from a GPS satellite constellation via antennas.

11. The method of claim 1, wherein displaying comprises displaying a traveling trace based on a sequence of the calibrated location information.

* * * * *